US006768995B2

(12) United States Patent
Thier et al.

(10) Patent No.: US 6,768,995 B2
(45) Date of Patent: Jul. 27, 2004

(54) REAL-TIME AGGREGATION OF DATA WITHIN AN ENTERPRISE PLANNING ENVIRONMENT

(75) Inventors: Adam Thier, Burnsville, MN (US); Jon M Sandles, York (GB); George Duncan Pearson, Firby (GB); Michael Gould, Easingwold (GB)

(73) Assignee: Adaytum, Inc., Bloomington, MN (US)

( * ) Notice: Subject to any disclaimer, the term of this patent is extended or adjusted under 35 U.S.C. 154(b) by 0 days.

(21) Appl. No.: 10/262,591

(22) Filed: Sep. 30, 2002

(65) Prior Publication Data

US 2004/0064433 A1 Apr. 1, 2004

(51) Int. Cl.[7] .............................. G06F 17/00; G06F 7/00
(52) U.S. Cl. ........................ 707/100; 707/104.1; 705/10
(58) Field of Search .............................. 707/1, 10, 100, 707/102, 104.1; 705/10, 28

(56) References Cited

U.S. PATENT DOCUMENTS

| | | | | |
|---|---|---|---|---|
| 6,151,601 A | * | 11/2000 | Papierniak et al. | 707/10 |
| 6,161,103 A | * | 12/2000 | Rauer et al. | 707/4 |
| 6,173,310 B1 | * | 1/2001 | Yost et al. | 709/201 |
| 6,182,060 B1 | * | 1/2001 | Hedgcock et al. | 707/1 |
| 6,308,162 B1 | * | 10/2001 | Ouimet et al. | 705/7 |
| 6,385,301 B1 | * | 5/2002 | Nolting et al. | 379/32.01 |
| 6,385,604 B1 | * | 5/2002 | Bakalash et al. | 707/3 |
| 6,411,936 B1 | * | 6/2002 | Sanders | 705/10 |
| 6,434,544 B1 | * | 8/2002 | Bakalash et al. | 707/2 |

OTHER PUBLICATIONS

Bakalash, et al., "Data and Database management System having Data Aggregation Module Integrated", Pub. No.: 2002/0129003 A1, Sep. 12, 2002, whole document.*
Govrin, et al. "System and Method for Analyzing and Utilizing Data by Executing Complex Analytical Models in Real Time", Pub.No. US 2003/0084053, May 1, 2003, whole document.*
"Microsoft Press Computer Dictionary", 1997, Microsoft Press, Third Edition, p. 130.*

* cited by examiner

Primary Examiner—Greta Robinson
Assistant Examiner—Susan Rayyan
(74) Attorney, Agent, or Firm—Shumaker & Sieffert, P.A.

(57) ABSTRACT

An enterprise business planning system includes a database having a relational data area and a transactional data area, and a server to store within the transactional data area contribution data received from a set of enterprise contributors. The server publishes the contribution data from the transactional data area to the relational data area. The transactional data area may include a set of contribution slots and a set of aggregations slots hierarchically related in accordance with an enterprise model. The relational area includes a set of related tables defined in accordance with the model. The transactional data area supports real-time interaction with the enterprise contributors, while the relational data area allows detailed statistical analysis and report generation.

16 Claims, 21 Drawing Sheets

REAL-TIME AGGREGATION OF DATA WITHIN AN ENTERPRISE PLANNING ENVIRONMENT

TECHNICAL FIELD

The invention relates to enterprise computing environments, and more particularly, to computing environments for enterprise business planning.

BACKGROUND

More than ever before, enterprises are charged with establishing accurate forecasts for enterprise operations. Failing to meet established expectations can have significant negative impact on the enterprise in the areas of cash flow, stock price, liquidity, and investor faith, among other areas. Examples of enterprise planning activities for which accuracy is critical include revenue forecasting, inventory management, resource planning, and the like. Enterprise business planning, however, is a difficult and expensive task that often produces inaccurate results.

Conventionally, businesses have taken either a "top-down" or a "bottom-up" approach to enterprise planning. In "top-down" planning, businesses identify fundamental business targets, such as average product price, cost per employee, and the like, and push the targets down through the hierarchical structure of the corporation. In contrast, "bottom-up" planning involves the aggregation of low-level forecasts from the lowest cost centers of an organization. For budget planning, for example, management personnel may be required to periodically forecast expenses, and allocate the expenses to a number of categories, such as advertisement, travel, and salaries. However, the bottom-up forecasts rarely, if ever, reconcile with top-down business targets.

This information has typically been collected using paper or, more recently, electronic forms, such as an electronic template created with a spreadsheet software program. This often leaves the financial department of the enterprise with the difficult task of consolidating uncoordinated plans that have been compiled using inconsistent assumptions and varying business logic.

More recently, large computer systems have been used to collect the data via an enterprise network. The computer systems typically consolidate data collected from the various enterprise users using time-consuming, offline batch processing during "off" hours. This offline consolidation can lead to significant time delays between the collection of the data from a user, and the consolidation of the collected data with other data collected from the enterprise. As a result, such systems often present users an inaccurate view of the actual, aggregated data for the enterprise activity being forecasted. This may lead the users to provide incorrect data, or erroneously modify their input. Furthermore, the users may be unsure as to which numbers are the "right" numbers for the enterprise, and may generally doubt the integrity of the results. This slow process of data collection and offline consolidation can be particularly problematic for a heavily deadline-oriented activity like enterprise planning.

SUMMARY

The invention is directed to enterprise planning techniques that improve the accuracy and predictability of budget planning within large organizations by enabling organizations to reconcile corporate financial models and organizational targets with detailed forecasts in real-time. In particular, the techniques make use of an enterprise planning database system having a transactional data area for real-time interaction with enterprise users, and a relational data area for detailed statistical analysis and report generation.

According to the techniques, an enterprise planning system enables and automates the reconciliation of top-down targets with detailed bottom-up forecasts for an enterprise. Generally, the enterprise planning system provides three stages of enterprise planning: (1) a modeling stage, (2) a contribution stage, and (3) a reconciliation stage. During the modeling stage, high-level enterprise managers or executives, referred to as analysts, define organizational targets, and build planning models for the enterprise. Next, during the contribution phase, a set of defined contributors interacts with the enterprise planning system and provides detailed forecasts in the form of contribution data. During the reconciliation phase, the enterprise planning system automates the reconciliation of the forecast data with the organizational targets.

During this process, the enterprise planning system operates in accordance with the defined model to provide a hierarchical planning process having multiple reconciliation levels. At each level, the enterprise planning system presents the contribution data to enterprise reviewers, as defined by the hierarchical model, and requires that the reviewer reconcile the target data with the forecast data. Each reviewer may, for example, reject or accept the contribution data in view of corporate targets provided by the analysts.

As the contributors provide the contribution data, the enterprise planning system automatically aggregates the contribution data across the enterprise in real-time, and presents the aggregated data to reviewers for acceptance or rejection. This process continues until the contribution data is ultimately approved by the reviewers associated with the highest level of the organizational hierarchy, thereby ensuring that the contribution data from the contributors reconciles with corporate targets.

In one embodiment, a system comprises a database having a relational data area and a transactional data area, and a server to store within the transactional data area contribution data received from a set of enterprise contributors, and to publish the contribution data from the transactional data area to the relational data area. The transactional data area may include a set of contribution slots and aggregations slots hierarchically related in accordance with an enterprise model. The relational area may comprise a set of related tables defined in accordance with the model.

In another embodiment, a method comprises receiving contribution data from a contributor of an enterprise in accordance with a multi-level enterprise model, and storing the contribution data for the contributor within a transactional area of a database. The method further comprises publishing the contribution data from the transactional area to a relational area of the database, and generating a report from the contribution data of the relational area of the database.

The invention may offer one or more advantages. For example, the techniques described herein may improve the accuracy and predictability of enterprise planning by enabling organizations to reconcile corporate models and organizational targets with detailed forecasts in real-time. The techniques may provide a platform that delivers collaborative, real-time planning capabilities, without requiring offline consolidation and aggregation of forecasts. Because the enterprise planning system can aggregate contribution data in real-time, all users can be presented with an accurate, up-to-date view of the numbers. The system provides rapid response regardless of the number of enterprise users involved in the planning, thus providing precise planning information.

Further, the architecture described herein can readily scale to thousands of users, and may be designed around best planning practices. In this manner, the system may used to centrally manage all planning information across operating units and systems within the enterprise, thus creating a "planning hub." Consequently, users can work from a single pool of planning data, and can be assured of the integrity of the data.

In addition, the techniques promote high user-participation across the enterprise, allowing planning cycles to be reduced, e.g., from months to weeks, and best practices, like rolling forecasting, to be quickly enabled.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
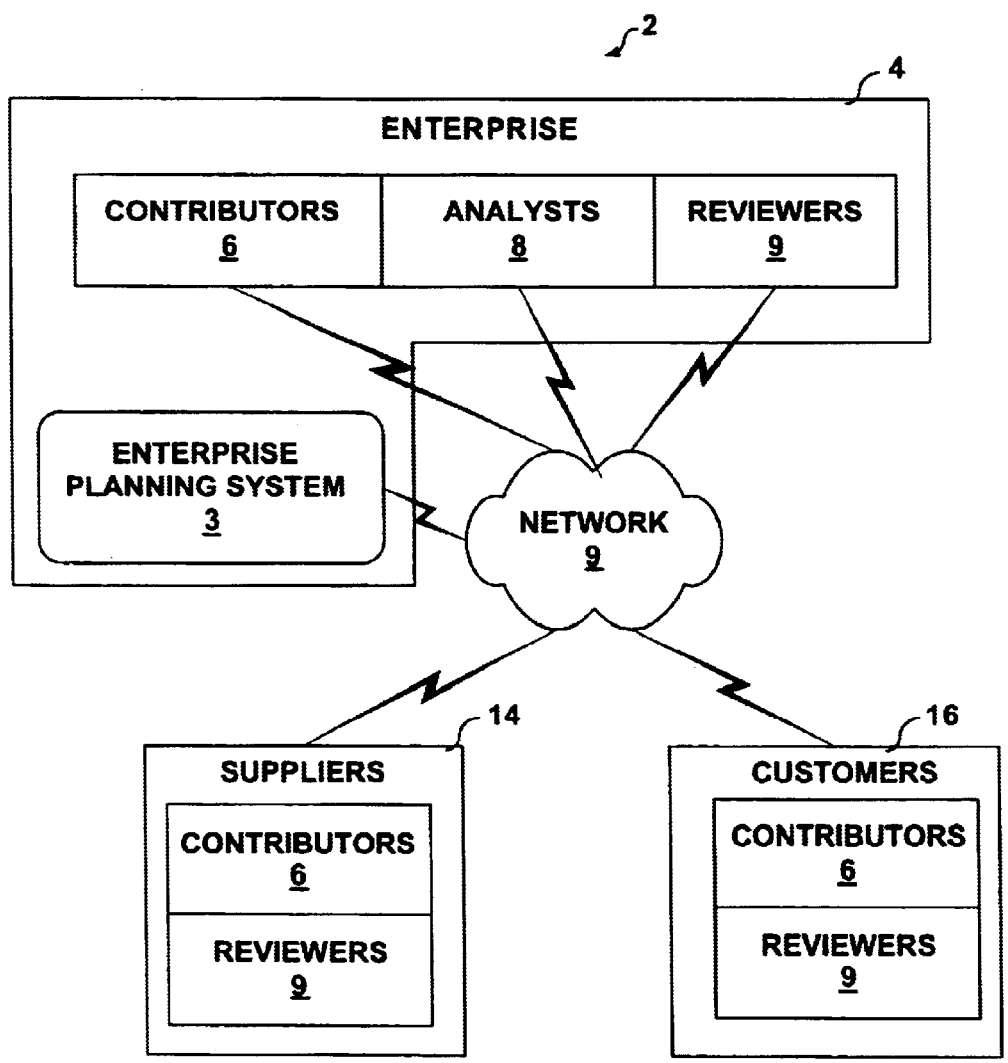
FIG. 1 is a block diagram illustrating an environment in which an enterprise planning system enables and automates the reconciliation of top-down targets with detailed bottom-up forecasts.

FIG. 1 is a block diagram illustrating an environment 2 in which enterprise planning system 3 enables and automates the reconciliation of top-down targets with detailed bottom-up forecasts for enterprise 4. Generally, enterprise planning system 3 provides three stages of enterprise planning: (1) a modeling stage, (2) a contribution stage, and (3) a reconciliation stage. In the modeling stage, analysts 8, such as the chief financial officer, senior financial analysts or product and sales analysts, define requirements and build planning models for the enterprise 4. More specifically, analysts 8 develop a model having a number of hierarchically arranged nodes representing various cost centers within enterprise 4, such as business units or departments.

During the modeling stage, analysts 8 also establish corporate targets for each node of the organizational hierarchy. Analysts 8 then assign one or more enterprise users to each node, such as managers, supervisors, sales representatives, lab managers, or the like, that are responsible for enterprise planning for the corresponding cost center. Each enterprise user may be designated as a contributor 8 that provides planning data to enterprise system 3, a reviewer that accepts or rejects contributions from contributors 8, or both. Contributors 8 and reviewers 9 may be authorized users within enterprise 4, or within other entities coupled to network 9, such as suppliers 14 and customers 16.

Finally, analysts 8 define a number of templates for collecting spending forecast data from the contributors. Analysts 8 include the corporate target data in the templates to facilitate reconciliation with the forecast data.

Next, enterprise planning system 3 enters the contribution phase during which contributors 6 interact with enterprise planning system 3 and input detailed forecasts in the form of contribution data. For example, contributors 6 may provide detailed financial forecasts, revenue forecasts, order forecasts, inventory forecasts, estimated resource requirements, and the like, depending on the particular enterprise planning activity being carried out by enterprise 4.

During the reconciliation phase, enterprise planning system 3 automates the reconciliation of the forecast data with the corporate targets provided by analysts 8. In particular, enterprise planning system 3 operates in accordance with the defined model to provide a hierarchical planning process having multiple reconciliation levels. As each of contributors 6 provides his or her contribution data, enterprise planning system 3 automatically aggregates the contribution data across enterprise 4 in real-time, and provides access to the aggregated data to reviewers 9 associated with higher levels of enterprise 4. In particular, upon receiving contribution data from contributors 6, enterprise planning system 3 identifies all higher levels of the organizational model affected by the newly received contribution data, and calculates new aggregate totals at each level in real-time.

Consequently, reviewers 9 view aggregated data across enterprise 4 in real-time during the enterprise planning session. At each level, enterprise planning system 3 ensures that reviewers 9, as defined by the nodes of the enterprise model, reconcile the target data with the forecast data. Each reviewer 9 may, for example, reject or accept the contribution data in view of corporate targets provided by analysts 8. This process continues until the contribution data is ultimately approved by the highest level of the organizational hierarchy, thereby ensuring that the contribution data from contributors 6 reconciles with corporate targets provided by analysts 8.

In this manner, enterprise planning system 3 may provide more accurate enterprise planning than with conventional techniques. For example, enterprise planning system 3 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts.

Because the enterprise planning system can aggregate contribution data in real-time, all users can be presented with an accurate, up-to-date view of the numbers. Further, the architecture of enterprise planning system 3 can readily scale to thousands of users, and may be designed around best planning practices. In addition, the techniques enabling high participation by enterprise users, i.e., contributors 6 and reviewers 9, allowing accurate planning cycles to be reduced Enterprise users may use a variety of computing devices to interact with enterprise planning system 3 via network 9. For example, an enterprise user may interact with enterprise planning system 3 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device. Network 9 represents any communication network, such as a packet-based digital network like the Internet. In this manner, system 2 can readily scale to suit large enterprises. The enterprise users may directly access enterprise planning system 3 via a local area network, or may remotely access enterprise planning system 3 via a virtual private network, remote dial-up, or similar remote access communication mechanism.

Figure 2:
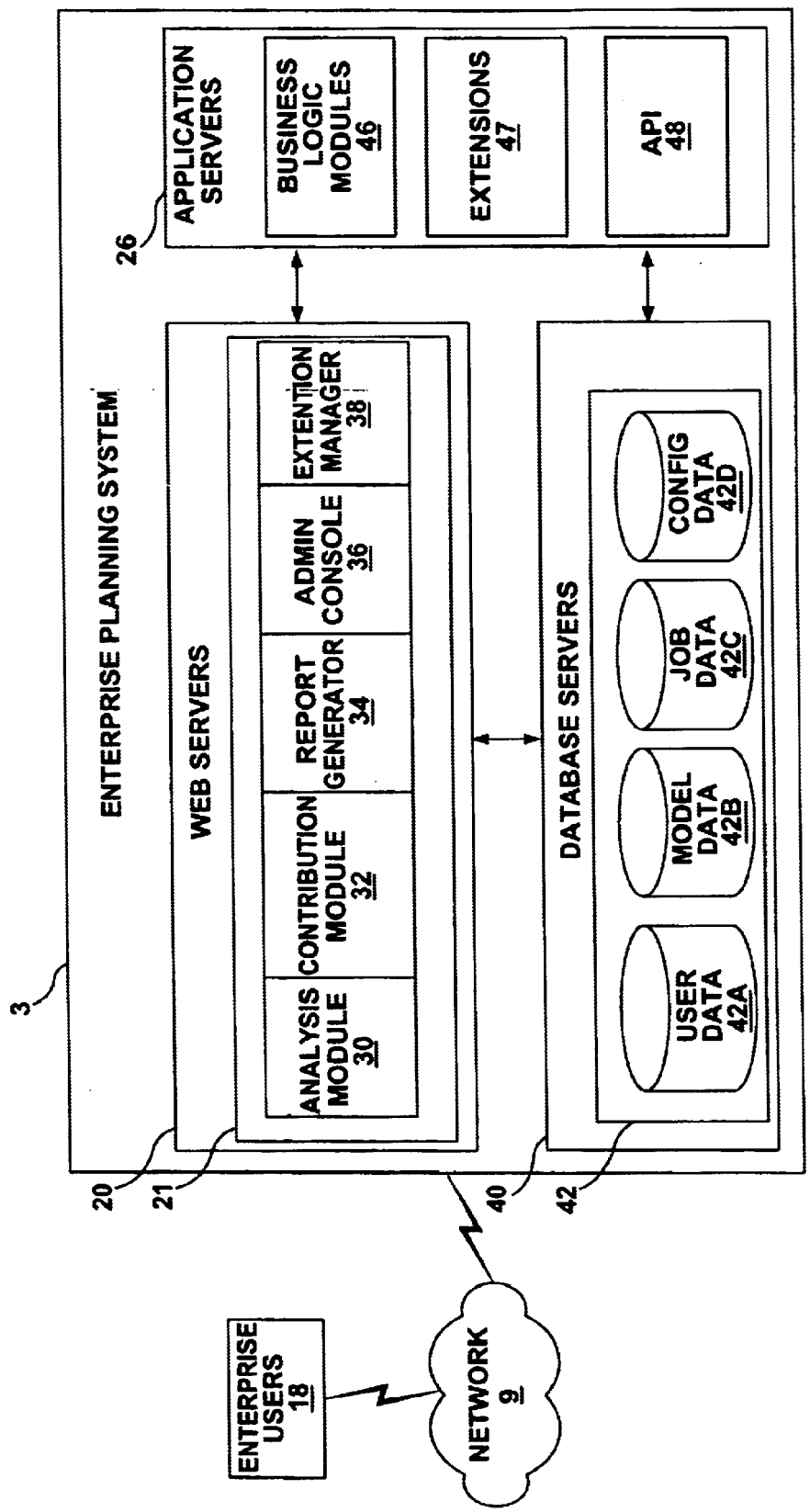
FIG. 2 is a block diagram illustrating one example embodiment of the enterprise planning system.

FIG. 2 is a block diagram illustrating one example embodiment of enterprise planning system 3. In the illustrated embodiment, enterprise planning system 3 includes web servers 20, application servers 26, and database servers 40.

Web servers 20 provide an interface for communicating with enterprise user 18 via network 9. Web servers 20 execute web server software, such as Internet Information Server™ from Microsoft Corporation, of Redmond, Wash. As such, web servers 20 provide an environment for interacting with contributors 6, analysts 8, and reviewers 9 according to software modules 21, which include analysis module 30, contribution module 32, administration (ADMIN) console 36, and extension manager 38.

Software modules 21 may comprise Lotus scripts, Java scripts, Java Applets, Active Server Pages, web pages written in hypertext markup language (HTML) or dynamic HTML, Active X objects, and other suitable modules. Web servers 20 serve up web pages defined by software modules 21, and communicate the web pages to computing devices of enterprise users 18. The web pages may include static media, such as text and graphic imagery, as well as conventional input media such as text entry boxes, radio buttons, drop-down menus, and the like, for receiving information from enterprise users 18.

Software modules 21 interact with database servers 40 to access enterprise data 42 including user data 42A, model data 42B, job data 42C, and configuration data 42D. Enterprise data may be stored in a number of different forms including one or more data storage file, or one or more database management systems (DBMS) executing on one or more database servers. The database management systems may be a relational (RDBMS), hierarchical (HDBMS), multidimensional (MDBMS), object oriented (ODBMS or OODBMS) or object relational (ORDBMS) database management system. Furthermore, although illustrated separately, enterprise data 42 could be combined into a single database or other data storage structure. Enterprise data 42 could, for example, be implemented as a single relational database, such as SQL Server from Microsoft Corporation.

User data 42A stores information for each of users 18, including the name, email address, and other contact information for the user. Model data 42B stores the enterprise planning models defined by the analysts 8. For example, model database 42B stores information that defines the reconciliation process developed by analysts 8, including the number of reconciliation levels, the various "nodes" in the hierarchy, and the contributor 6 associated with each node. In addition, model data 42B stores the respective data entry templates of the models for capturing contribution and review data from users 18. Job data 42C defines administration jobs for execution application servers 26, and configuration (CONFIG) data 42D stores basic configuration data for enterprise planning system 3.

Application servers 36 provide an operating environment for execution of business logic modules 46, enterprise planning extensions 47, and application programming interface (API) 48. In addition, application servers 36 carry out administration tasks as defined by job data 42C. In other words, job data 42 provides a mechanism for queuing job descriptions for pending administrative jobs for execution by application servers 26.

Referring to software applications 21, analysis module 30 includes one or more software modules for creating enterprise planning models, such as financial models for enterprise 4, to control the entire planning process. For example, analysis module 30 allows analysts 8 to define the various cost centers, the corresponding owners and the number of reconciliation stages in the enterprise planning process. In one configuration, analysis module 30 read cost-center structures and ownership from an enterprise resource planning (ERP) database (not shown). In addition, analysis module 30 allows analysts 8 to define the "templates" for collecting contribution data. A template may comprise one or more multi-dimensional structures that provide an interface for entering and calculating contribution data. For example, the template may define cost centers as a dimension within a data cube for selecting data, with a chart of accounts along the rows, and periods in the columns. Analysis module 30 stores the enterprise planning models, as well as the corresponding templates, within model data 42B.

Analysis module 30 also allows the organization to define a number of mechanisms for automating the budgeting process and ensuring that the contributors 6 submit their respective contribution data timely, and that templates quickly move through the defined reconciliation stages. For example, using analysis module 30, the analysts 8 can define timers for triggering electronic mail messages (emails) to remind the contributors 6 to access enterprise planning system 3 and complete a particular template.

Contribution module 32 include software modules for presenting the templates to enterprise users 18 designated as contributors 6, and for capturing contribution data from the contributors 5. Contribution module 32 captures and aggregates the contribution data across enterprise 4 in real-time, and provides access to the aggregated data to reviewers 9 associated with higher levels of enterprise 4.

Report generator 34 includes analytical software modules that generate enterprise planning reports based on the contribution data received from contributors 6 and stored within model data 42B. In particular, the analytical software modules allow users 18, such as analysts 8 and reviewers 9, to formulate complex queries for generating reports and performing other data analysis functions on the current data of the enterprise model. These software modules may be web-based modules having a browser interface, or may be stand-alone executable programs.

Business logic modules 46 execute within the operating environment provided by application severs 26, and provide functionality for accessing and processing the data stored within databases 42 in response to software modules 21. In particular, business logic modules 46 comprise software routines for implementing the enterprise planning functions, and are invoked by software modules 21.

Administration console 36 presents an interface for controlling the clustering of web servers 20, application servers 26, and database servers 40. Administration console 36 allows the system administrator to control the number of servers used within each cluster. The system administrator may, for example, select one or more servers available within network 9, and direct administration console 36 to utilize the servers as, for example, application servers 36. In this manner, enterprise planning system 3 may easily scale to support large enterprises having thousands of users 18.

When administrating a task associated with an enterprise planning activity, administration console 36 may break the task into a number of jobs, each job associated with a different slice of the model in accordance with the multi-level, organizational hierarchy defined by the particular model. For example, administration console 36 may separate a particular task into a set of N jobs, where N equals the number of nodes defined within the hierarchy. Administration console 36 may then distribute the jobs across the set of application servers 26 for which the model is deployed.

Administration console 36 provides a job interface for viewing jobs queued for processing by application servers 26, and viewing the load balancing across the clustered application servers 26. Administration console 36 generates job data 42C to define task for application servers 26. As jobs are queued within job data 42C, application servers 26 read job data 42C from the database servers 40, and process the jobs to completion. For example, one type of job involves the "cut-down" process by which the enterprise model defined within enterprise data 42B is "sliced" for each user. During this process, application servers 26 identify areas of the defined models to which users 18 are assigned, either as contributors or reviewers. Enterprise planning system 3 presents the respective slices to each user 18 to capture contribution data, and to reconcile the contribution data with organizational targets. In this fashion, enterprise planning system 3 need not communicate the entire model to each of users 18, thereby reducing communication time as well as resource requirements. Instead, each user 18 receives only relevant information.

In addition, administration console 36 allows a system administrator to control the deployment of enterprise planning models across application servers 26. In particular, analysts 8 may define a plurality of planning models for enterprise 4. For example, analysts 8 may define separate models for revenue forecasting, inventory management, resource planning, managing accounts payable, and the like. Administration console 36 allows the system administrator to create a deployment map that assigns each model to a set of application servers 26. In other words, different enterprise models can be deployed on separate application servers 26, or may share one or more application servers.

Consequently, the system administrator may finely control the allocation of computing resources to enterprise planning, and may adjust the resources to meet the current needs of the enterprise. The system administrator may adjust the deployment map to shift the deployment of the models across application servers 26 based on approaching deadlines for the enterprise planning activities. Specifically, the system administrator may allocate more computing resources to enterprise models having the earliest deadlines in view of the likely increased activity by users 18 as the deadlines approach. As another example, the system administrator may adjust the deployment map based on current usage levels for users 18 participating in the enterprise planning models.

Administration console 36 allows analysts 8 to modify an enterprise planning model. For example, analysts 8 may wish to capture additional contribution data after initiating an enterprise planning activity. To ease the adoption of the changes to the model, administration console 36 supports node level modification and maintenance of an enterprise planning model. In particular, administration console allows analysts 8 to check-in and check-out nodes of the model, i.e., to mark the node or otherwise change the state of the node from "online" to "offline." Consequently, an analyst 8 can updated a model "slice" associated with the particular offline, rather than interrupting the enterprise-wide planning activity. Other users cannot edit the offline node, i.e., no contribution data or review input can be saved to the respective slot for the node within transactional data area 62.

However, the enterprise contributors associated with the non-offline nodes may continue to provide and review contribution data for the enterprise planning session. This feature allows modification and maintenance on a per-node basis, and allows the model to remain operational. Accordingly, analysts 8 can modify the business logic associated with a particular node without taking the entire model offline.

Application servers 26 typically process model changes made by analysts 8. Specifically, in the event analysts 8 modify an enterprise model during the planning activity, application servers 26 may be used to reconcile contribution and review data received from users 18 with the updated model. Alternatively, administration console 36 may direct application servers 26 to facilitate remote reconciliation on the computing devices of users 18. Upon authenticating access by users 18 subsequent to the model change, authentication servers 44 may "push" reconciliation jobs to the local computing devices. The remote computing devices reconcile the contribution data and review data of users 18 with the updated model, and save the reconciled data to enterprise planning system 4. This may be advantageous in that enterprise planning system 3 need not be taken offline to update enterprise models, and that computing resources to process the updates can be distributed across the remote computing devices of users 18.

Extension manager 38 provides an interface by which a system administrator can install and selectively deploy extensions 47 to easily provide additional enterprise planning functions to system 10. In general, three classes of extensions can be added: (1) administration extensions, (2) server-side extensions, and (3) client-side extensions. Administration extensions comprise software modules that execute within, or invoked by, administration console 36. Consequently, administration extensions are typically used to provide additional administrative functionality, and may generate administration jobs for execution by application servers 26.

Server-side extensions typically execute within the operating environment provided by application servers. These extensions may be used to facilitate workflow integration, custom initialization, or custom publishing of aggregated contribution data during the planning activity.

In contrast, client-side extensions comprise software modules that execute within the operating environment of the remote computing devices of users 18, typically within a web browser environment. Contribution module 32 automatically searches extensions 47 for newly installed extensions, and downloads the extensions to users 18 upon their next access. In particular, contribution module 32 may load and invoke the extension on the remote computing device immediately upon user access, or upon demand. Although client-side extensions typically operate within the operating environment of the remote computing devices, the extensions may interact with server-side components.

To facilitate the incorporation of extensions, enterprise planning system 3 provides an application programming interface (API) 48 by which extensions 47 can directly access and manipulate models within model data 42B, as well as other components of enterprise planning system 3. Via extension manager 38, the system administrator can register new extensions 48 with system 10, and define inputs for launching the extensions, e.g., buttons or other graphical icons.

Extension manager 38 allows the system administrator to selectively deploy extensions based on the role assigned to the particular user 18. In particular, extension manager 38 allows the system administrator to assign extensions to all contributors 6, and to all reviewers 9. In addition, extension manager 38 allows the system administrator to assign extensions to different slices of enterprise planning models stored within model data 42B. In this manner, extensions may be assigned to different cost centers, different business departments, and the like. Furthermore, extensions may be assigned based on the level of a reviewer 9 within the hierarchy defined by the particular model. For example, reviewers 9 of a certain level of the hierarchy, e.g., controllers for cost centers, may be required to complete a best-practices extension that provides detailed best practices validation on all aggregated contribution data. Extension manager 38 may store user-specific extension information within user data 42A indicating which extensions are assigned to each of users 18, and possibly setting user-specific properties for the extension. This flexibility advantageously allows an enterprise planning model to be adapted and customized as the enterprise planning session extends deeper into enterprise 10.

One example of an extension is an extension that provides a wrapper around an off-the-shelf collaborative network-based planning tool, such as NetMeeting from Microsoft Corporation. Instead of rejecting contribution data, a reviewer 9 can invoke the extension to conference in the subordinate, and directly access model data 42B to review the contribution data together. Another example is an extension that enables real-time validation of a contribution against other sources. Other examples of extensions include: (1) extensions for customized reporting functions required by certain users 18 within the hierarchy, (2) extensions for exporting planning data to other applications, e.g., a spreadsheet application, (3) extensions for driving newly developed printing engines, (4) extensions for importing enterprise data, and (5) extensions for interfacing with a document management system.

Extension manager 38 allows the system administrator to map extensions 47 to events or messages within system 3. For example, the system administrator may install a new extension, and require that the extension be invoked upon receiving contribution data from one of contributors 6 via contribution module 32. This feature may be particularly useful for deploying best practices validation of contribution data or enforcement of other enterprise requirements. As another example, an extension may be used to enforce reconciliation of top-down corporate targets with bottom-up forecasts within a predefined defined percentage, e.g., ten percent. As another example, an extension may be used to reduce forecasts to a certain level or by a particular percentage. Accordingly, uniform decreases in forecasts can easily be required and enforced across enterprise 4.

In one embodiment, extensions 47 may comprise software modules that conform to the component object model (COM). Consequently, an ActiveX client may be easily used to invoke extensions 47. Each extension 47 may provide one or more common interfaces for invocation and control, e.g., by contributor module 32 or administration console 36.

Figure 3:
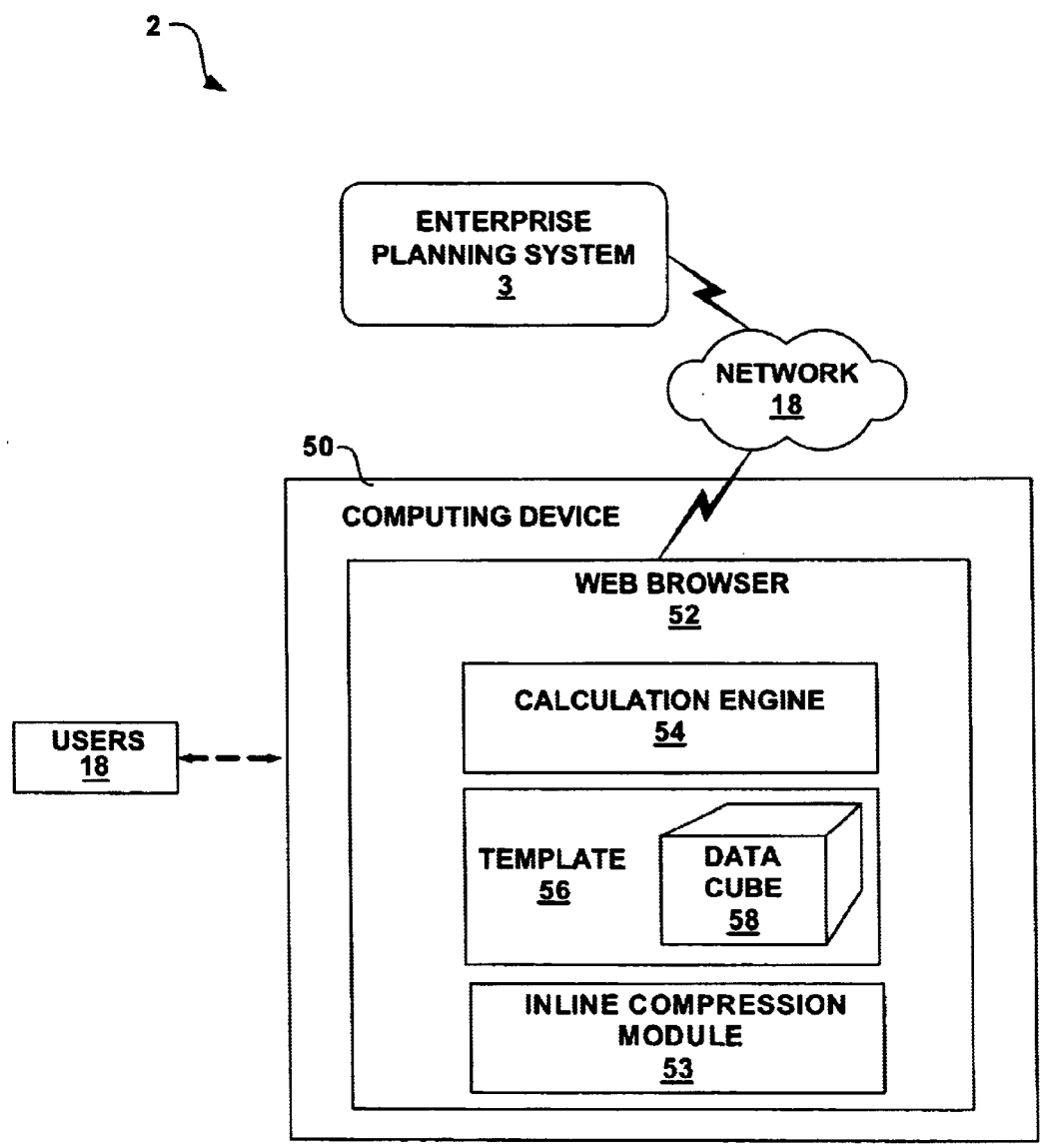
FIG. 3 is a block diagram illustrating one embodiment of a remote computing device for interacting with the system.

FIG. 3 is a block diagram illustrating one embodiment of a computing device 50, including various software modules executing thereon, when operated by a user 18, such as a contributor 6 or a reviewer 9. In the exemplary embodiment, computing device 50 includes web browser 52, calculation engine 54, template 56 and data cube 58. When a user 18 directs computing device 50 to access enterprise planning system 3, calculation engine 54, and template 56 are downloaded and installed within web browser 52.

In one embodiment, calculation engine 54 comprises a forward calculation engine 54 wrapped in an Active X object built in an array-based language. Template 56 comprises an Active X control that includes any necessary drivers for entering and manipulating budget forecast data. Template 56 includes a stand-alone data cube 58 containing the top-down target data, and the bottom-up contribution data, and allows all calculations to be performed locally. Therefore, after the download is complete, each contributor 6 can modify his or her respective contribution data within template 56, and perform calculations without accessing enterprise planning system 3. As ActiveX components, calculation engine 54, template 56 and data cube 58 are maintained locally via computing device 50. As such, the contributor 6 will only experience network delays when template 56 and calculation engine 54 are initially downloaded, as well as when template 56 is saved at the end of a session.

To interact with enterprise planning system 3, each of contributors 6 uses browser 52 to interact with template 56 to provide respective contribution data, e.g., by completing cells of a displayed grid, and viewing the dynamic changes that occur to calculated items within the grid. Because calculation engine 54 is resident within web browser 52, the cell entries do not have to be resubmitted to enterprise planning system 3, recalculated, and then re-posted to the web browser 52 via network 9. If the contributor 6 wishes to end the planning session, but has not finished the process, the contributor 6 can save template 56 and data cube 58 to enterprise planning system 3. When the contributor 6 wishes to continue the planning session, he or she can access enterprise planning system 3, at which time the appropriate template 56 and data cube 58 will be loaded in web browser 52 for further editing. When the contributor 6 is satisfied with the budget data entered within template 56, the contributor 6 can submit the data to enterprise planning system 3. As each contributor 6 provides his or her contribution data, or accepts the contribution data, enterprise planning system 3 automatically aggregates the contribution data across enterprise 4 in real-time, and provides access to the aggregated data to reviewers 9 associated with higher levels of enterprise 4.

In similar fashion, each of reviewers 9 interacts with enterprise systems 3 via web browser 52 executing upon his or her remote computing device 50. Each reviewer 9 may reject or accept the contribution data in view of corporate targets provided by the analysts 8. This process continues until the contribution data is ultimately approved by the reviewers associated with the highest level of the organizational hierarchy, thereby ensuring that the contribution data from the contributors reconciles with corporate targets.

In one embodiment, web browser 52 includes inline compression module 53 for automatically compressing communication to enterprise planning system 4, and decompressing communications received from the system. In particular, inline compression module 53 automatically intercepts outgoing buffers transmitted from web browser 52 to system 10 via the hypertext transport protocol (HTTP), and automatically compresses the buffers prior to transmission. Similarly, inline compression module 53 intercepts incoming HTTP buffers, and determines whether the buffers are compressed. If the buffers are compressed, inline compression module 53 automatically decompresses the buffers, and forward the decompressed buffers to web browser 53. In this manner, inline compression module 53 seamlessly compresses and decompresses communications between computing device 50 and enterprise planning system 3, leading to possible efficiency gains within system 2.

In one embodiment, enterprise planning system 3 makes use of a single active server page (ASP) to receive the compressed HTTP buffers, and direct the compressed buffers to appropriate business logic modules 46 for decompression and processing. A header with each HTTP buffer may include a byte count or other information indicating whether the buffer is compressed, and an identifier for an appropriate business logic module 46.

Figure 4:
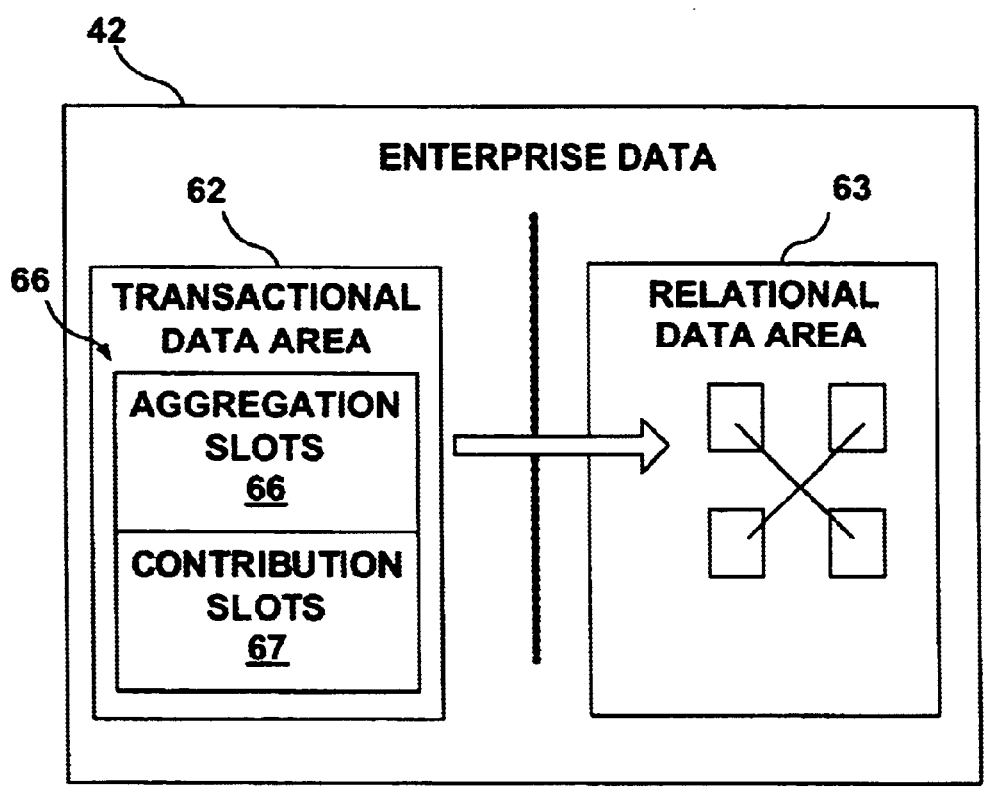
FIG. 4 is a block diagram illustrating an example embodiment of database servers in which enterprise data is organized to include a transactional data area and a relational data area.

FIG. 4 is a block diagram illustrating an example embodiment of database servers 40 in which enterprise data 42 is organized to include a transactional data area 62 and a relational data area 63. In general, transactional data area 62 supports real-time data acquisition and aggregation from users 18, while relational data area 63 is used for report generation and complex data analysis.

More specifically, database servers 40 store contribution data received from contributors 6 in transactional data area 62, and publish the contribution data from transactional data area 62 to relational data area 63, e.g., on a periodic basis. Transactional data area 62 includes a number of slots 66 that are hierarchically related in accordance with the enterprise model. Transactional data area 62 includes a set of contribution slots 66 to store contribution data received from contributors 6, and a set of aggregations slots 67 to store aggregated data calculated from the contribution data in real-time and in accordance with the hierarchy defined by the model. Consequently, transactional data area 62 includes a transaction slot 67 for each of the enterprise contributors 6 to store the contribution data received from the respective enterprise contributor. In addition, transaction data area 62A associates each reviewer 9 with at least one of the aggregation slot 67 for each reviewer 9. For example, an enterprise model may have N hierarchically arranged nodes, each node defining at network user and designating the user as one of a contributor and a reviewer. In this configuration, transactional data area comprises N slots, including an aggregation slot for each reviewer and a transaction slot for each contributor defined by the model.

Figure 5:
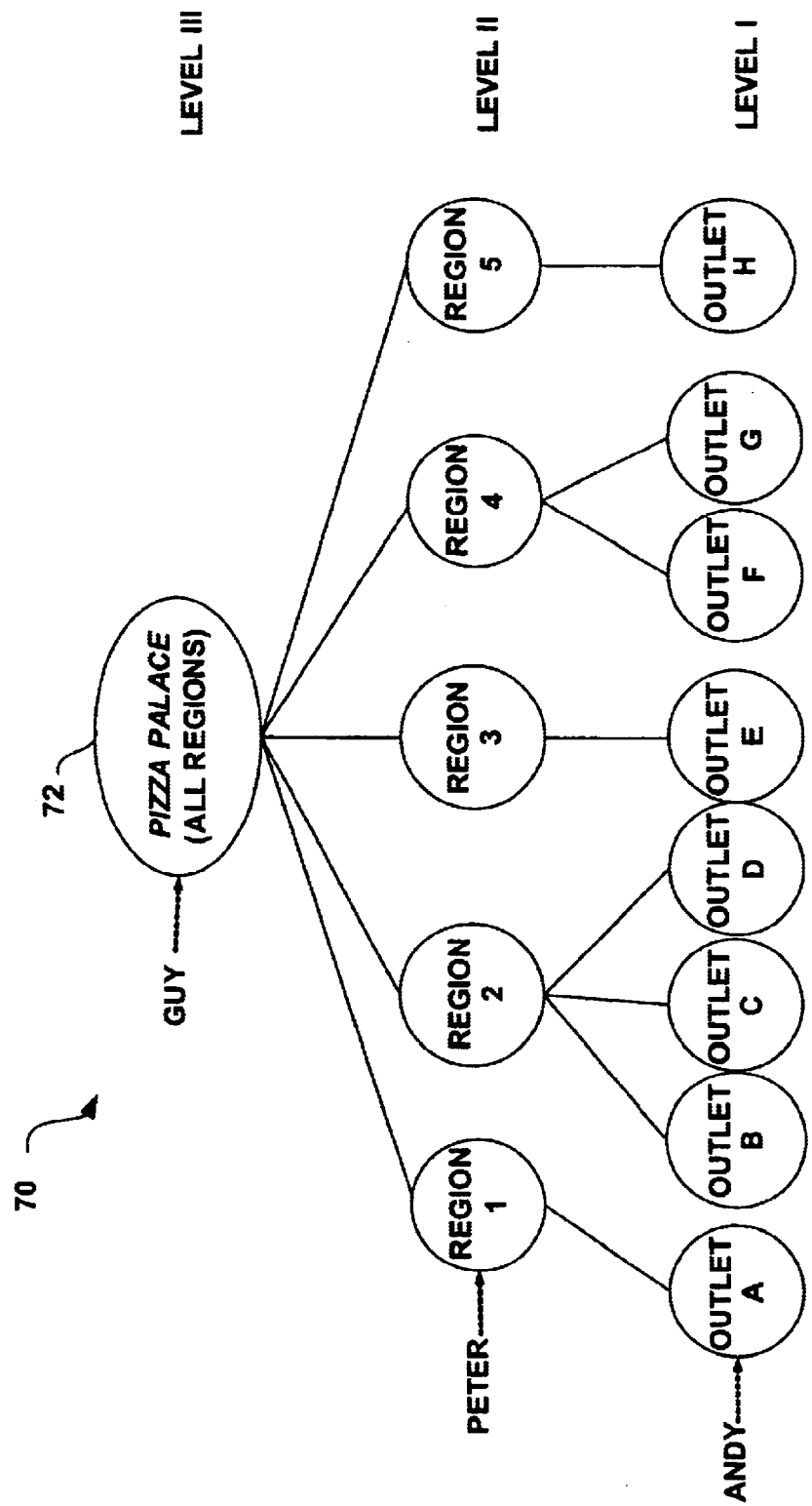
FIGS. 5 and 6 are block diagrams illustrating an example organization of the transactional data area in accordance with a hierarchy defined by an enterprise planning model.
Figure 6:
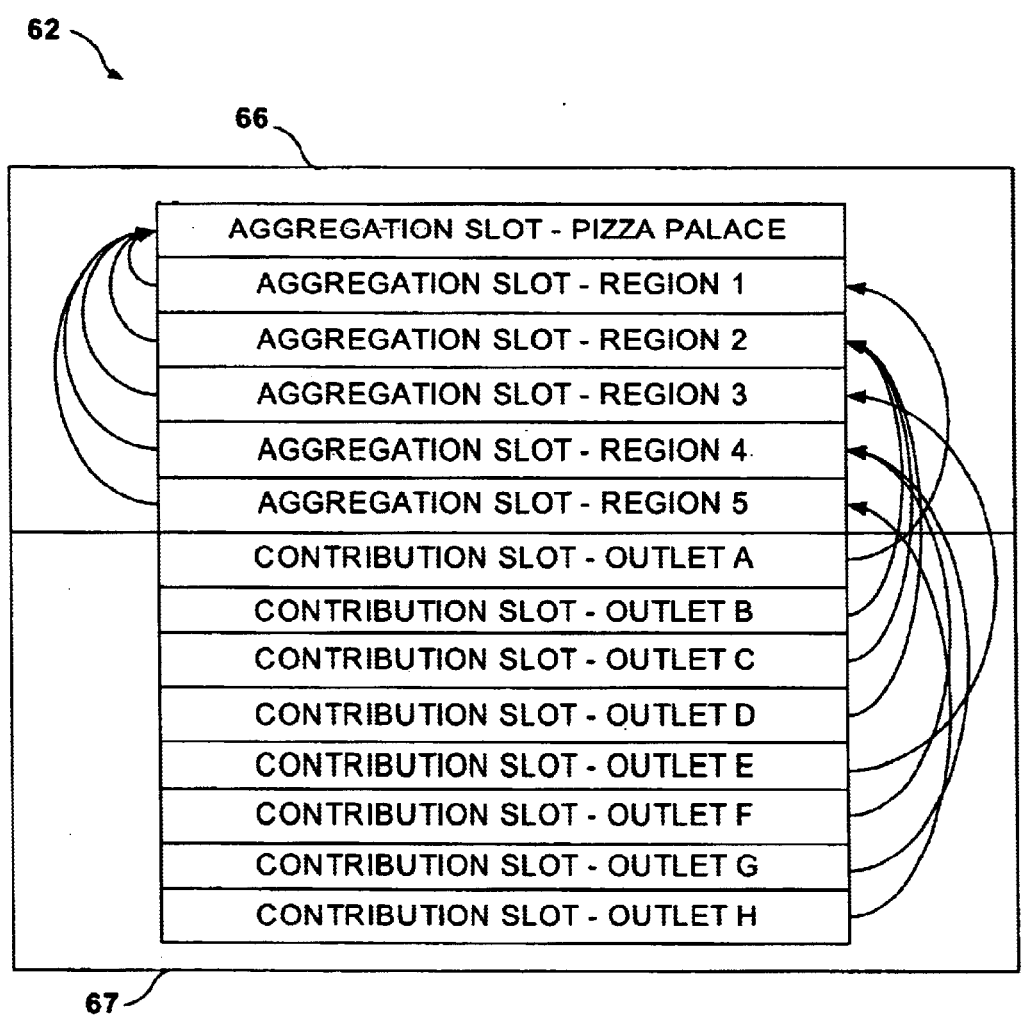

FIGS. 5 and 6 are block diagrams further illustrating the organization of transactional data area 66 in accordance with a hierarchy defined by an enterprise planning model. FIG. 5 depicts an example hierarchy defined by an enterprise planning model for an example fictitious pizza chain: Pizza Palace, Inc. Hierarchy 70 is horizontally organized around the various geographic regions occupied by the franchise, regions 1 through 5, and vertically organized into three reconciliation levels. Enterprise goals and targets are set by the analysts 8, and are distributed down through the various nodes of the hierarchy. The individual stores of the franchise, referred to as outlets, occupy the bottom level, i.e., Level III, and provide contribution data.

Each node of Level 1 has a corresponding contributor 6 that is responsible for entering contribution data. Similarly, each node of Levels I, II is associated with a reviewer 9 for reconciling the contribution data in view of the corporate targets defined by analysts 8. For simplicity, FIG. 5 illustrates one of the contributors, Andy associated with Outlet A, and two reviews: Peter associated with Region 1, and Guy associated with the node. In this example, Guy is the Chief Financial Officer for Pizza Palace, Inc. and is responsible for the overseeing all regions. Guy, therefore, is listed as an "owner" of root node 29 and as a "reviewer" for all Regions 1–5. Peter is a middle level manager charged with overseeing Region 1. As such, Peter is listed as the owner of Region 1 and reviewer for Outlet A. Andy, a manager of a local pizza store, is listed as the owner for Outlet A.

Each node of hierarchy 70 is associated with one or more corresponding templates within model data 42B, depending upon the node's level within the hierarchy. For example, each outlet within Level III is associated with a single template for capturing forecast information. At Level II, each region is associated with the templates of its corresponding child nodes, i.e., the outlets within the region. Root node 72 of hierarchy 70 is, therefore, associated with all of the templates for the company.

FIG. 6 illustrates an example organization of transactional data area 62 for supporting real-time aggregation of contribution data in accordance with hierarchy 70 defined by the enterprise planning model for Pizza Palace. In this example, transactional data area 62 includes contribution slots 66 for each node of Level III, i.e., each of Outlets A–H. Each contribution slot 66 stores contribution data for the contributor 6 associated with the respective node of Level III of hierarchy 70.

Similarly, transactional data area 62 includes aggregations slots 67 for each node of Levels I, II, i.e., root node 72 and the nodes corresponding to Regions 1–5. Each aggregation slot 67 stores aggregated contribution data for its child nodes, as defined by hierarchy 70 and represented in FIG. 6 by arrows. For example, aggregation slot 74 corresponds to root node 72, and stores aggregated data calculated by totaling all data received from Regions 1–5. As another example, aggregation slot 76, corresponding to Region 2, stores aggregated data calculated from contribution data for Outlets B–D. In this manner, transactional data area 62 provides an accurate, up-to-date view of data for all levels of the model, thus facilitating enterprise-wide planning.

Figure 7:
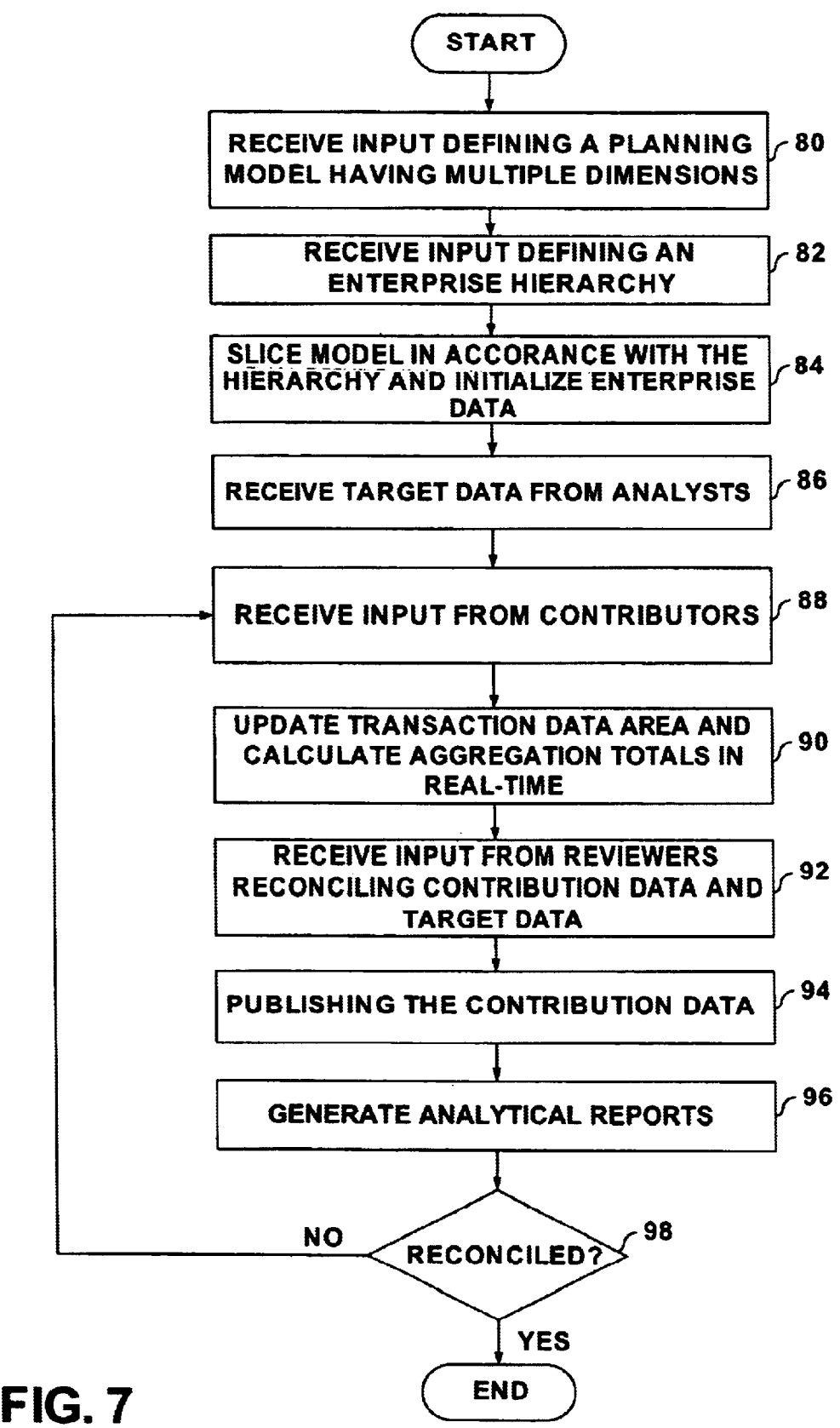
FIG. 7 is a flowchart illustrating in further detail the operation of an enterprise planning system.

FIG. 7 is a flowchart illustrating in further detail the operation of enterprise planning system 3. Initially, analysts 8 interact with enterprise planning system 3 to develop a planning model that include one or more data cubes having multiple dimensions (80). For example, for Pizza Palace, Inc., the model may define a single data cube having thee dimensions: (1) a first dimension listing specialty pizzas, e.g., meat lovers, vegetarian, barbeque, seafood, ham and mushroom, (2) a second dimension for weekly sales forecasts, and (3) a third dimension for corporate targets.

Analysts 8 also define an organizational hierarchy for controlling the enterprise-wide planning process (82). For Pizza Palace, for example, analysts 8 may define an organization hierarchy having fourteen nodes as illustrated in FIG. 5. Analysts 8 assign one or more enterprise users to each node, and designate each user as a contributor, reviewer, or both. In addition, analysts 8 may designate one of the users associated with each node as an owner of that respective node.

Upon receiving the organizational hierarchy, application servers 26 of enterprise planning system 3 processes the model in view of the hierarchy to "slice" the model for each defined user. In other words, application servers 26 apply the hierarchy to the model as if the hierarchy were an additional dimension, and identifies a respective portion of the model for which each user can access. Application servers 26 associate each node in the hierarchy with a slice across the other dimensions of the model. By slicing the model in this manner, enterprise planning system 3 need not communicate the entire model to the remote computing device of the user, but need only communicate the relevant portion of the one or more data cubes of the model.

In addition, application servers initialize enterprise data 42, including creating the appropriate number of aggregation slots 66 and contribution slots 67 of transactional data area 62, as well as creating create the tables and relationships of relational data areas 63.

Next, analysts 8 interact with the enterprise planning system 3 to provide target data for the enterprise (86), and contributors 6 interact with the system to provide detailed forecasts in the form of contribution data (88). Upon receiving the contribution data, application servers 26 update contribution slots 67 of transaction data areas 66 to store the contribution data, and update aggregation slots 66 in real-time to store aggregate totals for each of the upper levels nodes of the enterprise hierarchy.

In this manner, the aggregate totals are readily available for reviewers 9 across enterprise 4. Consequently, reviewers 9 can access enterprise planning system 3, and immediately provide review input either rejecting or accepting the contribution data and the aggregate totals in view of the target data provided by analysts 8 (92). During this process, application servers 26 periodically publish contribution data and aggregate data from transactional data area 62 to relational data area 6 (94) for creation of analytical reports and other statistical analysis by report generator 34 (96). Enterprise planning system 3 repeats the reconciliation process until the contribution data and aggregate totals are accepted by the high-level reviewer of the organizational hierarchy (98).

Figure 8:
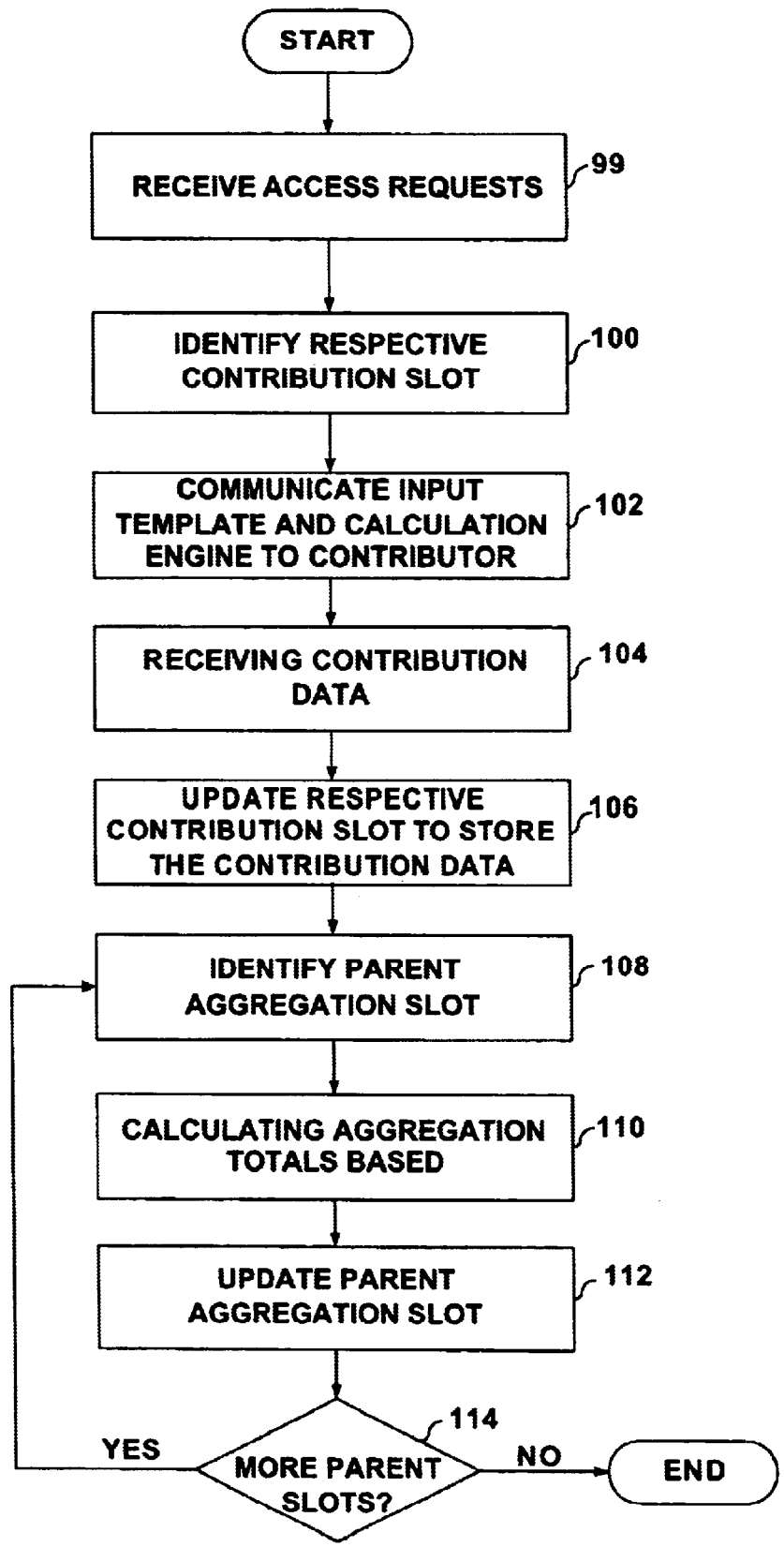
FIG. 8 is a flowchart illustrating in further detail the real-time aggregation process performed by the enterprise planning system.

FIG. 8 is a flowchart illustrating in further detail the real-time aggregation process of enterprise planning system 3. Upon receiving an access request from one of contributors 6 (99), application servers 26 access enterprise data 42 and identify a respective contribution slot for the contributor (100). Application servers 26 retrieve from the identified slot any contribution data previously stored by the contributor, and communicates an input template 56 and contribution engine 54 to the contributor 6 (102).

Upon receiving new or updated contribution data from the contributor 6 (104), application servers 26 update the respective contribution slot to store the contribution data (106). Next, application servers 26 selectively update the aggregate totals of aggregation slots 66 for any parent aggregation slots related to the updated contribution slot. In particular, application servers 26 identifies the immediate parent aggregation slot for the updated contribution slot based on the defined hierarchical model (108), calculates new aggregate totals for the parent slot based on the updated contribution slot (110), and stores the new aggregate totals to the parent slot (112). Application servers 26 repeat this process until all related higher-level aggregation slots have been updated (114).

In one embodiment, application servers 26 organize transactional data area 62 as a single table having a set of rows. Each row corresponds to a respective node in the defined organizational hierarchy. Application servers 26 store respective contribution data or aggregation data within each row, and may store the data as a row that contains a single "blob" of data. Specifically, application servers 26 may write the data for a given row as a single string or text or binary data. In one embodiment, each row is stored as packed text that conforms to the extensible markup language (XML). The packed XML describes each cell for the slice of the model that pertains to the user associated with the row, as well as the current value for the cells. When initializing transactional data area 62, application servers 26 extract metadata from the one or more data cubes of the model, and create an XML representation of each "slice" of the model within the respective slot.

When updating the contribution data, the XML may be generated by the remote computing device of the user. The remote computing device may generate the XML, and communicates the XML as part of the HTTP buffer, either in compressed or uncompressed form. Alternatively, application servers 26 may generate the XML.

To update the aggregate totals in real-time, application servers 26 parse the XML for the respective parent aggregation slots to quickly retrieve current values for the cells, and replace the packed XML with a new entry having updated aggregate totals. The aggregate data may be stored in XML form as a linear array having a set of cells to store the aggregate totals. Consequently, application servers 26 may retrieve the linear array from one aggregation slot, overlay the array with the array of a parent aggregation slot, and quickly recompute the aggregate totals for the parent slot.

Figure 9:
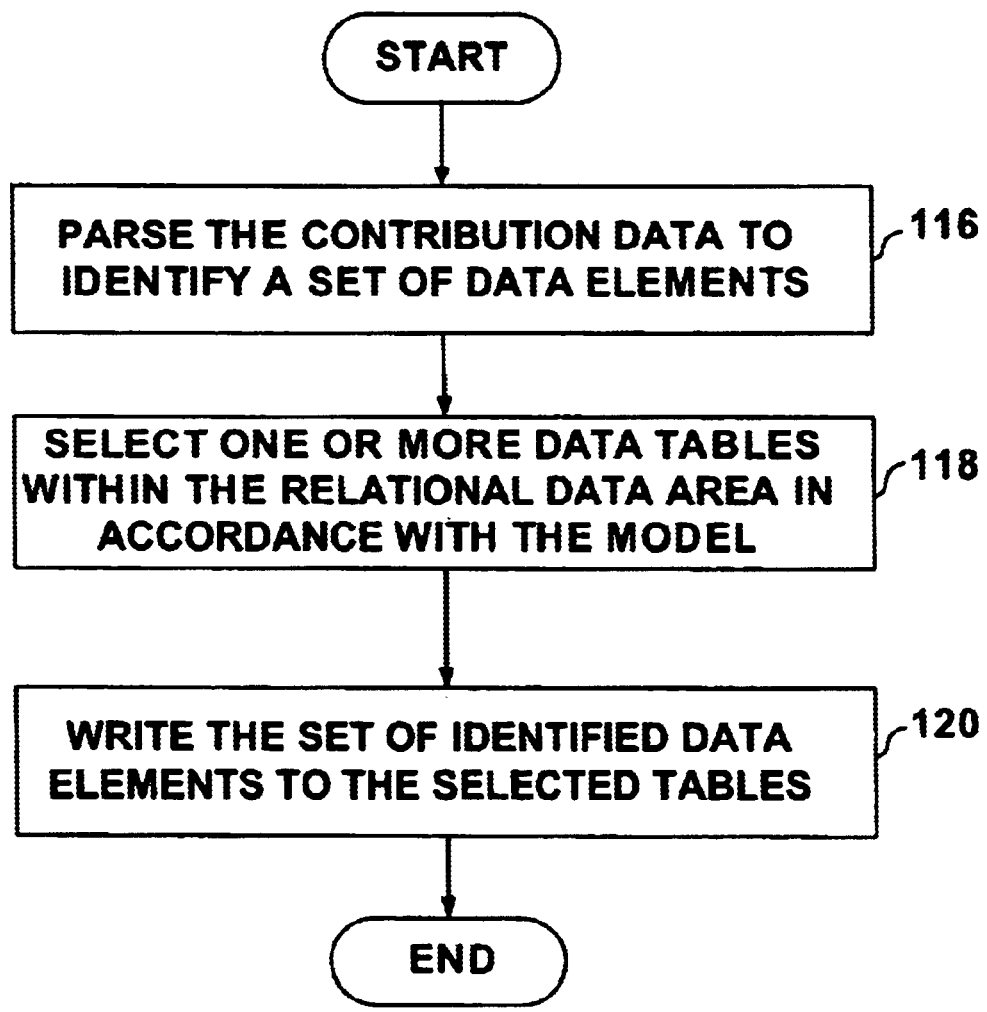
FIG. 9 is a flowchart illustrating in further detail example operation of a set of application servers in publishing data from the transactional data area to the relational data area.

FIG. 9 is a flowchart illustrating in further detail example operation of application servers 26 in publishing data from transactional data area 62 to relational data area 63. Application servers 26 may publish the data periodically, e.g., every 15 minutes, 30 minutes, and the like. Alternatively, or in addition, application servers 26 may publish the data in response to an event, e.g., submission of contribution data from a contributor 6, or review input from a reviewer 9.

To publish the data, application servers 26 pass the contribution data of each contribution slot 67 to identify a set of date elements and respective values (116). As described above, each slot 67 may contain packed XML describing a slice of the enterprise planning model. Application servers 26 decompress the packed XML, and identify the contained cells of the data cubes of the model, as well as the current values for the cells.

Next, based on the model, application servers 26 select one or more tables from relational data area 63 that correspond to the parsed contribution data (118). For example, application servers 26 may identify a Sales table to store forecasted product sales.

Finally, application servers 26 write the parsed data into the identified tables of relational data area 63. Consequently, reporting module 34 may issue complex queries to database servers 40 to generate sophisticated reports or perform similar analysis on contribution data captured across enterprise 4.

Figure 10:
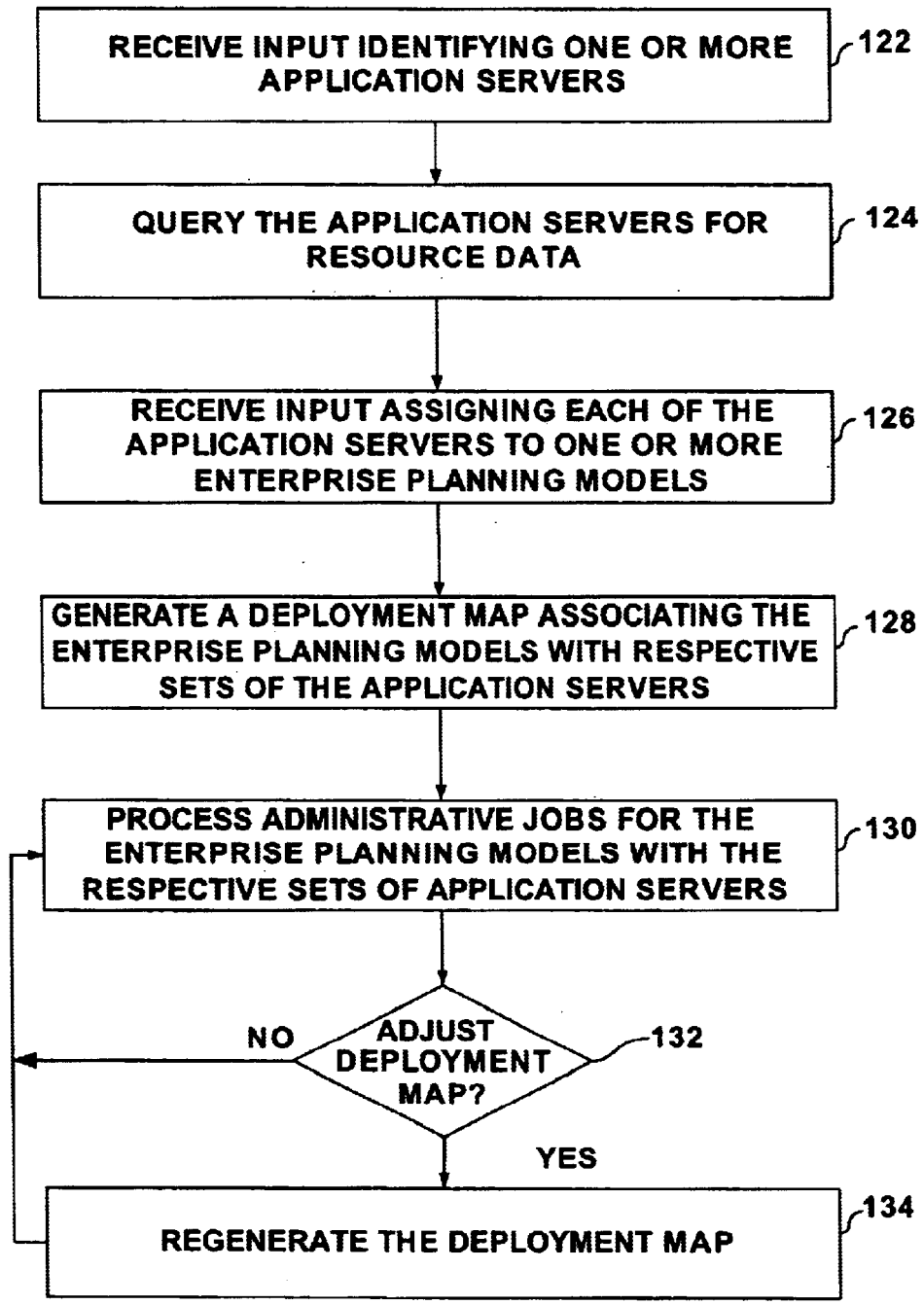
FIG. 10 is a flowchart illustrating an example mode of operation of an administration console in controlling the deployment of multiple enterprise planning models across a set of application servers.

FIG. 10 is a flowchart illustrating an example mode of operation of administration console 36 in controlling the deployment of multiple enterprise planning models across application servers 26. Initially, administration console receives input identifying one or more application servers 26 (122). For example, a system administrator may select the application servers 26 from a list of servers available within a local area network. Alternatively, the system administrator may specify a particular name, Internet Protocol (IP) address, or similar communication handle for communicating with the application server.

In response, administration console 36 queries the identified applications servers for a description of the computing resources present on each server, such as the number of processors present within each application servers 26 (124). Administration console 36 may present this information to the system administrator for use in deploying the various planning models of enterprise 4.

Next, administration console 36 receives input from the system administrator that assigns each model to a set of application servers 26 (126). Based on the input, administration console 36 generates a deployment map associating each model with respective sets of the application servers, and stores the map within enterprise data 21 (128).

Based on the mapping, business logic modules 46 generates jobs for administering the enterprise planning sessions, and stores job descriptions within job data 42C. Application servers 26 read and process the job descriptions, as described above, in accordance with the deployment map (130). In this manner, different enterprise models can be deployed on separate application servers 26, or may share one or more application servers.

The deployment map may be adjusted, either in response to input from the system administrator or dynamically based on current loading levels of application servers 26 (126). Specifically, administration console direct regeneration of the deployment map, thereby rebalancing the deployment of the enterprise planning models across clusters of application servers 26.

Figure 11:
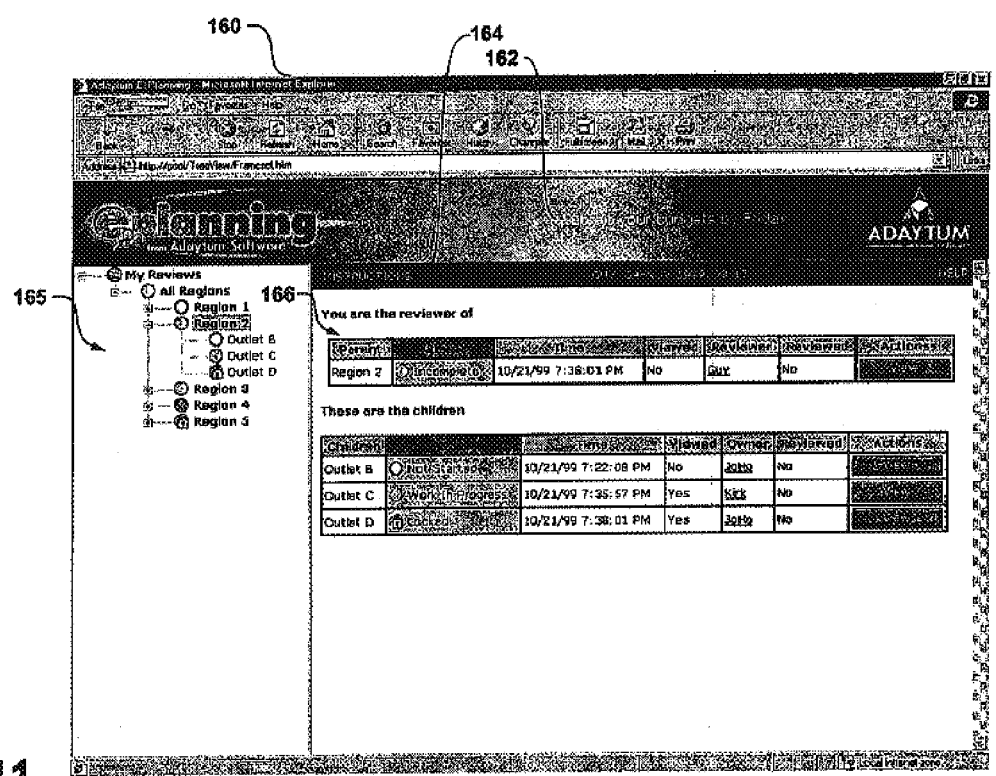
FIGS. 11–21 illustrate a number of views presented by a web browser during an exemplary enterprise planning session.

FIGS. 11–19 illustrate a number of views of web browser 52 during an exemplary enterprise planning session for the fictitious Pizza Palace Inc. described above. For example, FIG. 11 illustrates one embodiment of a window 160 displayed by web browser 52 when Guy, the CFO, accesses enterprise planning system 3 in order to check on the progress of the various budgets for the pizza franchise. In this example, Guy has accessed enterprise planning system 3 using Internet Explorer from Microsoft Corporation running Shock Wave™ from Macromedia™ Inc.

Window 160 displays: 1) a customizable headline 162 to all contributors and reviewers of a give budget template, 2) a link 164 for displaying instructions, 3) the name of the contributor, and 4) the current date. Enterprise planning system 3 may use the authentication built into the operating system of the remote computing device for security such that new passwords do not have to be created and managed separately.

Window 160 includes a left frame 165 that displays the hierarchal model 138 defined by analysts 8 for the pizza chain. The hierarchy, as described above, includes five sales regions, with Region 2 having 3 pizza stores (Outlet B–Outlet D). The hierarchy represents the workflow of the corporation and, therefore, may be intuitive to the contributors. Furthermore, each contributor has a limited view such that left frame 165 only displays the portion of the hierarchal model 138 for which the particular contributor has access. Because Guy is a high-level executive defined as a reviewer for all five regions, he can view the entire hierarchy.

Right frame 166 and left frame 165 cooperate in that when a user selects a node in the hierarchy within left frame 165, right frame displays the details of the selected node and its children. More specifically, right frame 166 displays tables detailing the selected node and each of its children. Each table shows: a) a node name, b) an operating state for the node, c) a time of last modification to the template, d) whether the budget template has been opened by the owner of the node, e) a name of the owner/reviewer, f) whether the budget template has been reviewed, and g) actions that the user may take on the node.

At the bottom level in the hierarchy, each node has three workflow states: a) NS—the budget has not been started, b) WIP—the budget is a "work in progress" such that the owner has input some data but has not finished, and c) LOCKED—the owner has submitted the budget for review. Once the budget is submitted, the owner cannot make changes unless the next level reviewer rejects the submission, which changes the state of the lower line node back to WIP.

Figure 12:
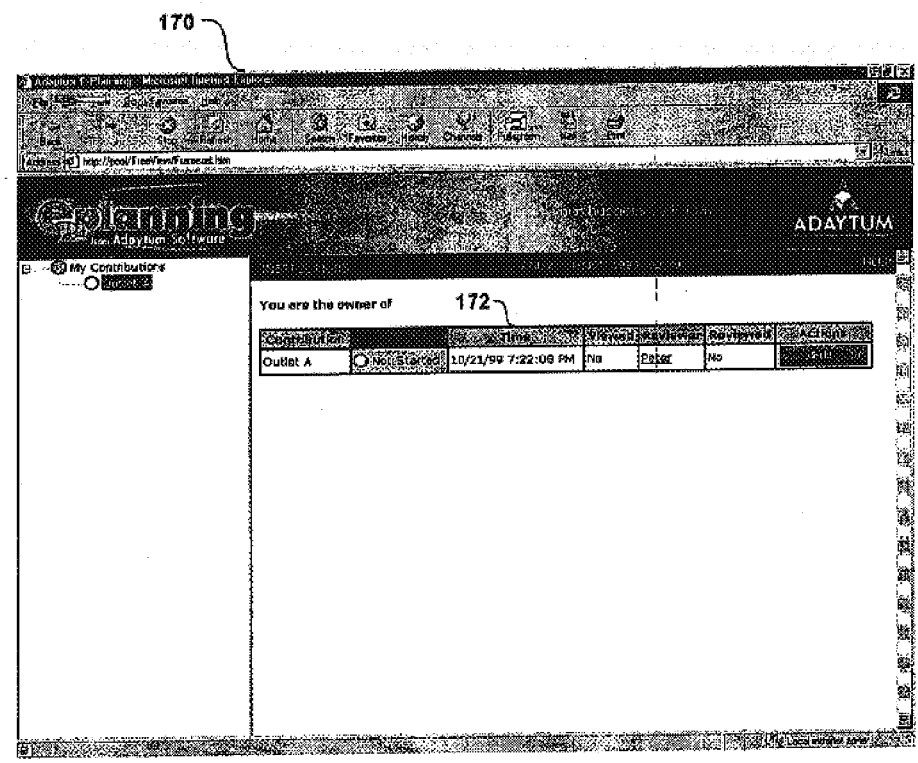

The view for Andy, a manager for a local pizza store, is quite different than from Guy. FIG. 12 illustrates an example window 170 displayed by web browser 52 when Andy accesses enterprise planning system 3. As illustrated by FIG. 12, Andy can only view Outlet A, i.e., the outlet for which he is responsible. Because Andy has not started the budgeting process, table 172 of the right frame displays the NS state for the node.

Figure 13:
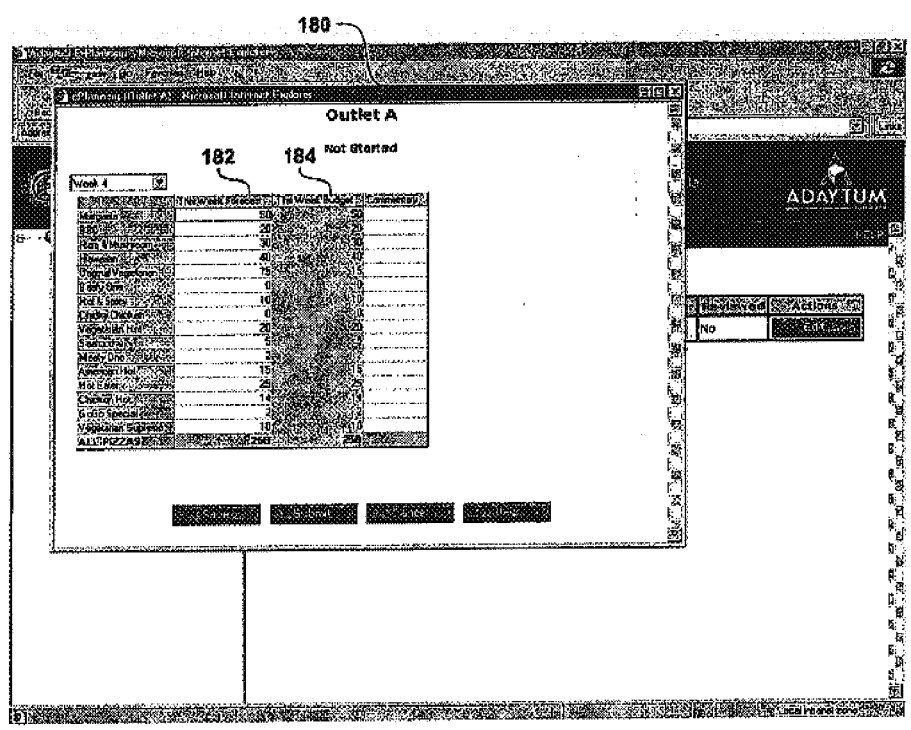

FIG. 13 illustrates a window 180 displayed when Andy clicks on Outlet A and initiates the enterprise planning process. At this point, web browser 52 downloads template 56 and data cube 58. This is one of the few times when there is traffic across network 9. As the calculation engine 54 resides on the client, no web traffic takes place as the user enters budgeting information. Andy interacts with window 180 to input spending forecast data 182, but cannot update target data 184 that has been set by analysts 8, and cannot overwrite formulas embedded within template. In this manner, window 180 allows Andy to view the financial targets set by analysts 8 while entering the detailed forecasting information. Calculation engine 54 allows window 180 to operate as an intelligent spreadsheet that supports, arithmetic operations, conditional logic, weighted and time averages and a number of other operations. In addition, the analysts can configure window 180 to provide context sensitive help for the row, column and page items. Upon entering spending forecast data 182, Andy can save the information and continue the process later or can submit the forecast information to Peter for review.

Figure 14:
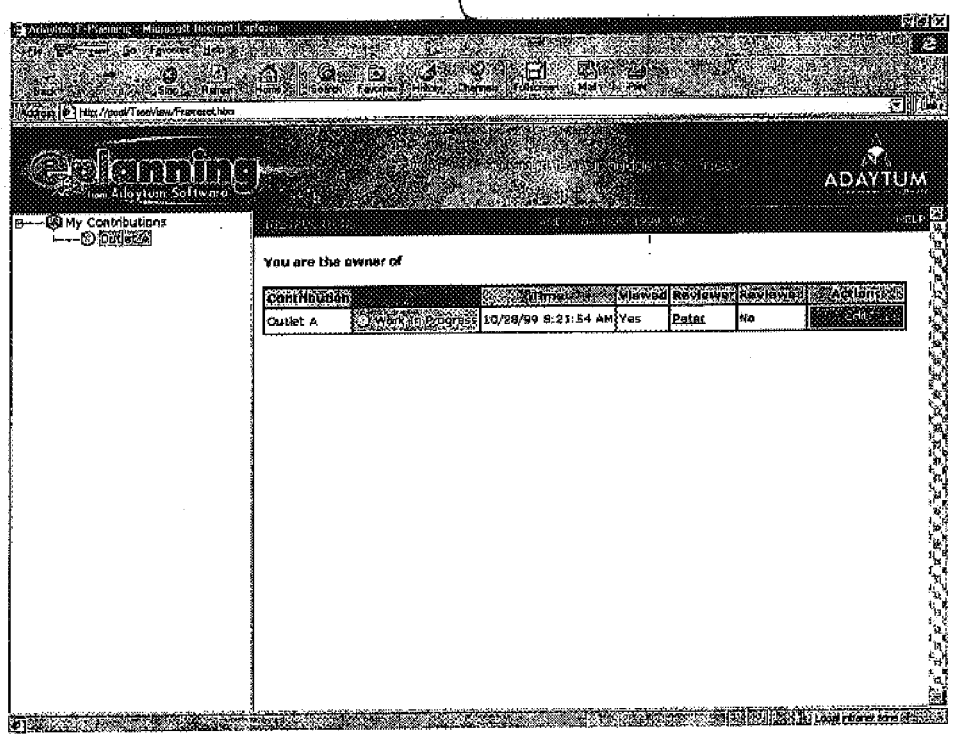
Figure 15:
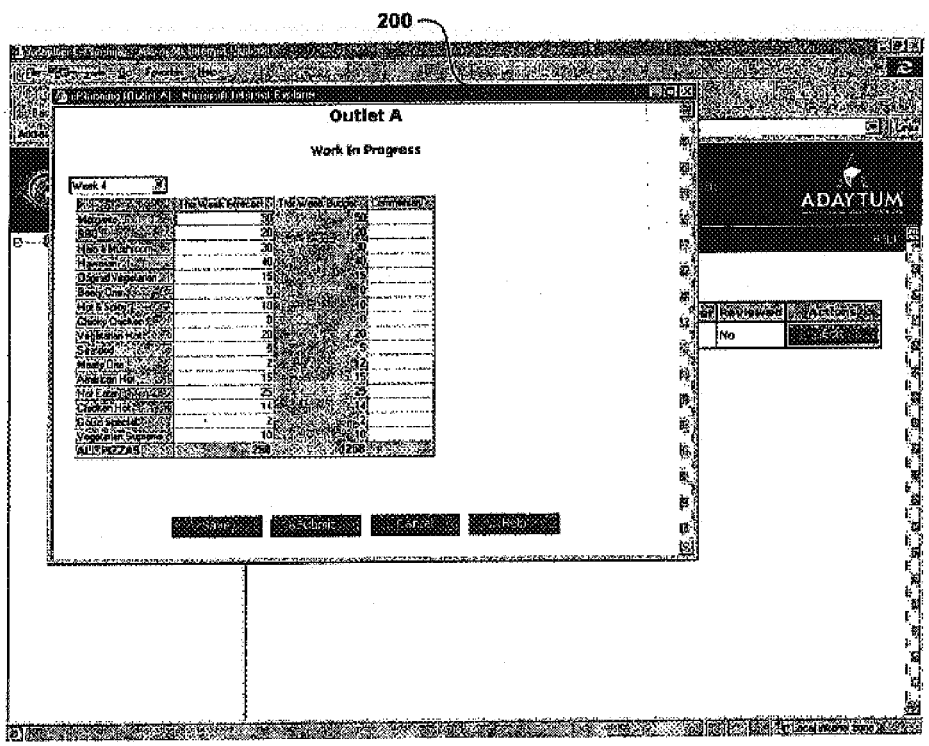
Figure 16:
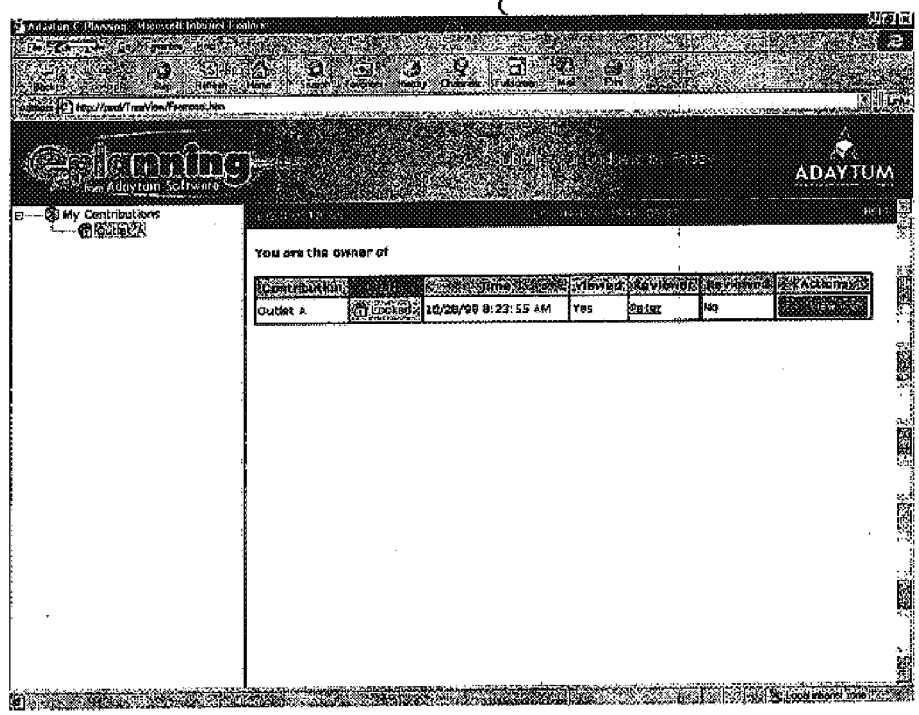

When Andy saves the template, as illustrated in FIG. 14, web browser 52 displays window 190, which reflect the state of the node as a "work in progress" (WIP). In this state, Andy can return and continue to edit the forecast data and submit the forecast data for review by Peter, as illustrated by window 200 of FIG. 15. Once the forecast data is submitted, the state of the node is changed to LOCKED, as indicated by window 210 of FIG. 16. In this state, Andy cannot modify the forecast information unless Peter reviews the template and rejects the information.

Figure 17:
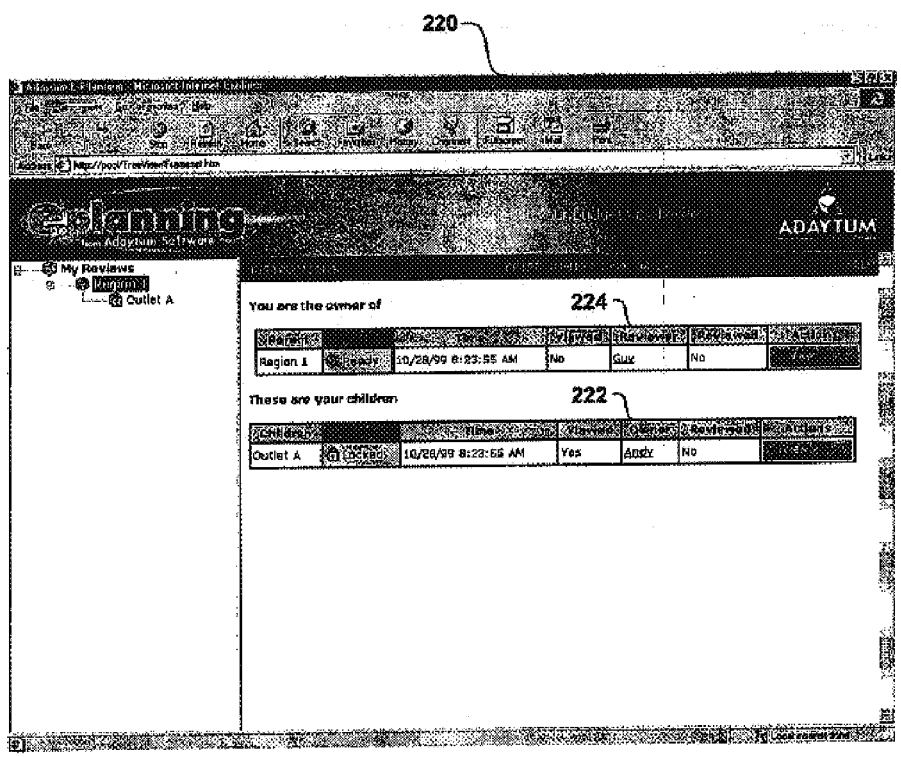

FIG. 17 illustrates an example window 220 displayed by web browser 52 when Peter accesses enterprise planning system 3 in order to review the budget information for which he is responsible. As illustrated by FIG. 17, Peter is defined as the owner for Region 1 and the reviewer for Outlet A. Upon logging in, Peter is immediately able to tell that Andy has submitted the budget information, which is reflected by the LOCKED state displayed by table 222 of the right-hand window. In addition, because all of the child nodes to Region 1, i.e. Outlet A, have submitted forecast information, table 224 displays the state of Region 1 as READY, indicating Peter can review all of the budget information.

Figure 18:
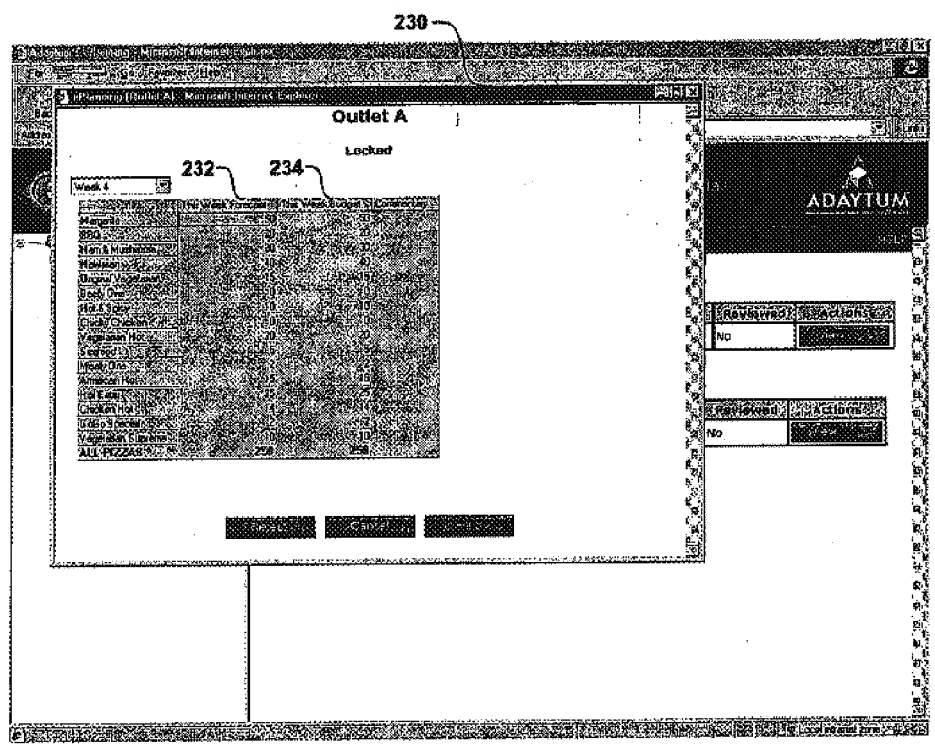

FIG. 18 illustrates an example window 230 displaying the template when selected by Peter for review. Notably, all information, including the forecast data 232 set by the owner (Andy) and the target data 234 set by the financial analysts, is read-only and cannot be modified. As such, Andy has two options as a reviewer: (1) reject the forecast information and send the grid back to Peter for modification, or (2) approve the forecast information such that the template can be reviewed by Guy, the designated reviewer for Region 1. At this level, the node has five possible states. The first three are similar to the Level I nodes: NS (not started), WIP (work in progress) and LOCKED. In addition, higher-level nodes can also be INCOMPLETE and READY. The INCOMPLETE state occurs when at least one child node is in the NS state, i.e., when a person reporting to the reviewer has not started the budgeting process.

Thus, reviewers 9 can quickly tell if the template has not been viewed, and that the owner needs some added prompting. The READY state occurs when all child nodes have completed the budgeting process. At this point, the reviewer is the critical path of the budgeting process and must either reject or submit the data from the subordinates. One advantage of this approach over other methods of data collection is that the middle level managers have a simple and efficient method of showing upper level management that they have approved of, and are committed to, the budgeting forecasts.

Figure 19:
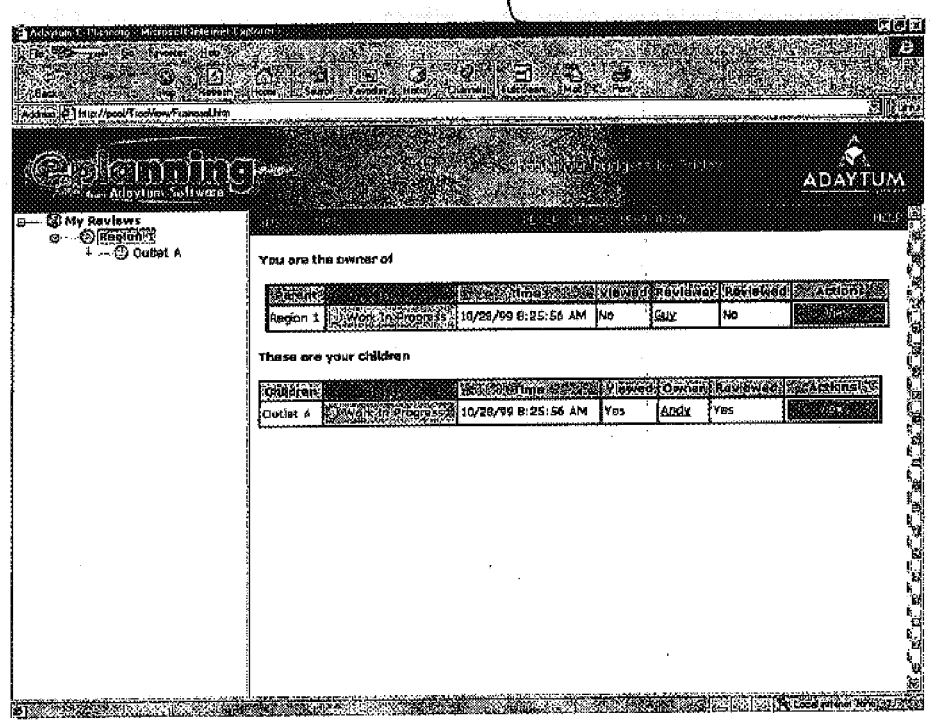

FIG. 19 illustrates an example view of the information when Peter rejects the information from Outlet A. Outlet A has transitioned back to the WIP state, which therefore also moves Region I to the WIP state. Andy, the owner, automatically receives an e-mail from Peter, his reviewer, telling him why the submission was rejected. This reconciliation process continues until acceptable budget information is ultimately propagated upward through all of the levels of the hierarchy.

Figure 20:
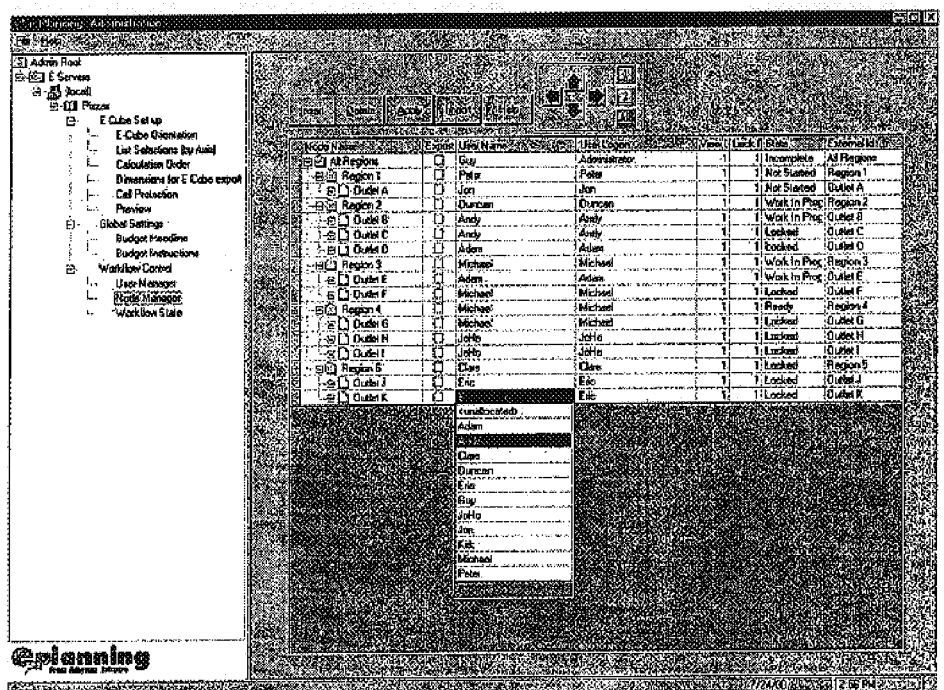
Figure 21:
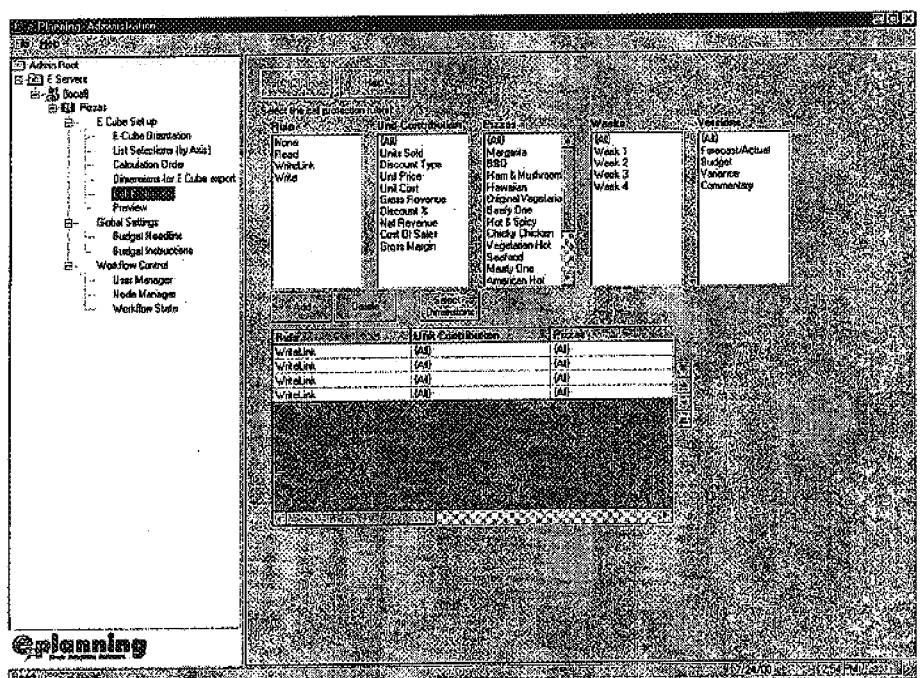

FIG. 20 illustrates an example view presented by browser 52 when an analyst 8 creates and maintains an enterprise model, including assigning owners to the various nodes of the hierarchy. FIG. 21 illustrates an example view presented by browser 52 when the analyst defines an access level (e.g. read vs. write) for each node.

Various embodiments of the invention have been described. These and other embodiments are within the scope of the following claims.

What is claimed is:

1. A system comprising:
   a database having a relational data area and a transactional data area; and
   a server to store within the transactional data area contribution data received from a set of enterprise contributors, and to publish the contribution data from the transactional data area to the relational data area,
   wherein the transactional data area includes a set of contribution slots to store the contribution data and aggregations slots to store aggregated totals of the contribution data, the contribution slots and the aggregation slots being hierarchically related in accordance with an enterprise model, and
   wherein the enterprise model has hierarchically arranged nodes, and the transaction data area includes a slot for each of the nodes of the enterprise model.

2. The system of claim 1, wherein the hierarchically arranged nodes comprise N nodes associated with the enterprise contributors, and M nodes associated with a set of enterprise reviewers, and the transactional data area comprises N+M slots.

3. The system of claim 1, wherein for each enterprise contributor the server:
   receives the contribution data from the enterprise contributor;
   selects in accordance with the enterprise model a respective slot form the set of contribution slots; and
   stores the contribution data received from the enterprise contributor within the selected slot.

4. The system of claim 1, wherein the database stores the contribution data and the aggregation totals in a format compliant with a data description language.

5. The system of claim 2, wherein in response to an access request from one of the reviewers, the server selects the aggregation slot associated with the reviewer by the enterprise model, and presents for review the aggregation totals from the selected aggregation slot and the contribution data stored by a set of the contribution slots related to the selected aggregation slots in accordance with the enterprise model.

6. The system of claim 5, wherein the server receives review information from each of the reviewers that accepts or rejects the contribution data stored within contribution slots related to the selected aggregation slots by the enterprise model, and selectively updates the selected aggregation slot in response to the review information.

7. The system of claim 1, wherein the server:
   receives the contribution data from the enterprise contributors;
   selects contribution slots associated with the enterprise contributors in accordance with the enterprise model;
   updates the selected contribution slots to stores the received contribution data;
   identifies in accordance with the enterprise model any of the aggregation slots related to the updated contribution slots; and
   updates the aggregation totals of the identified aggregation slots based on the received contribution data.

8. The system of claim 1, wherein the relational area comprises a set of related tables defined in accordance with the enterprise model, and the server parses the contribution data of the transactional data area to identify a set of data elements, selects one or more of data tables within the relational data area in accordance with the enterprise model, and writes the set of data elements to the selected tables.

9. A method comprising:
   defining a multi-level enterprise model to include N hierarchically arranged nodes;
   associating each node with one or more enterprise users, wherein each enterprise user is an enterprise contributor or an enterprise reviewer;
   updating each node to assign the associated enterprise user as one of a contributor and a reviewer;
   receiving contribution data from the enterprise contributors in accordance with the multi-level enterprise model;
   storing the contribution data for the enterprise contributors within a transactional area of a database, wherein the transactional data area includes a set of contribution slots and aggregation slots hierarchically related in accordance with the multi-level enterprise model;
   publishing the contribution data from the transactional area to a relational area of the database; and generating a report from the contribution data of the relational area of the database.

10. The method of claim 9, wherein storing the contribution data comprises selecting a slot from a set of contribution slots within the transactional area in accordance with the enterprise model; and storing the contribution data to the selected slot.

11. The method of claim 9, further comprising:

calculating aggregation totals based on the received contribution data; and updating the aggregation slots to store the calculated aggregation totals.

12. The method of claim 9, further comprising storing the contribution data and the aggregation totals in a format compliant with a data description language.

13. The methods of claim 9, further comprising:

receiving an access request from one of the enterprise reviewers;

selecting, in response to an access request and in accordance with the enterprise model, an aggregation slot associated with the enterprise reviewer from which the request was received;

identifying one or more of the contribution slots related to the selected aggregation slot in accordance with the enterprise model; and presenting for review the aggregation totals of the selected aggregation slot and the contribution data stored by the identified contribution slots.

14. The method of claim 13, further comprising:

receiving review information from the enterprise reviewer that accepts or rejects the contribution data stored within the identified contribution slots; and selectively updating the selected aggregation slot in response to the review information.

15. The method of claim 9, wherein storing the contribution data comprises storing the contribution data for each of the contributor and the aggregation totals for each of the reviewers in a format compliant with a data description language.

16. The method of claim 9, wherein the relational area comprises a set of related tables defined in accordance with the enterprise model, and publishing the contribution data comprises:

parsing the contribution data of the transactional data to identify a set of data elements;

selecting one or more of data tables with the relational data area in accordance with the enterprise model; and writing the set of data elements to the selected tables.

* * * * *